(12) United States Patent
Shimizu

(10) Patent No.: US 11,970,341 B2
(45) Date of Patent: Apr. 30, 2024

(54) ARTICLE TRANSFER FACILITY

(71) Applicant: Daifuku Co., Ltd., Osaka (JP)

(72) Inventor: Kiyoshi Shimizu, Hinocho (JP)

(73) Assignee: Daifuku Co., Ltd., Osaka (JP)

(*) Notice: Subject to any disclaimer, the term of this patent is extended or adjusted under 35 U.S.C. 154(b) by 444 days.

(21) Appl. No.: 17/289,955

(22) PCT Filed: Sep. 18, 2019

(86) PCT No.: PCT/JP2019/036553
§ 371 (c)(1),
(2) Date: Apr. 29, 2021

(87) PCT Pub. No.: WO2020/090270
PCT Pub. Date: May 7, 2020

(65) Prior Publication Data
US 2022/0009725 A1    Jan. 13, 2022

(30) Foreign Application Priority Data
Oct. 31, 2018  (JP) .................................. 2018-205276

(51) Int. Cl.
*B65G 47/52* (2006.01)
*B25J 9/00* (2006.01)
(Continued)

(52) U.S. Cl.
CPC ............ *B65G 47/52* (2013.01); *B25J 9/0093* (2013.01); *B65G 47/905* (2013.01); *B65G 47/912* (2013.01); *B25J 9/026* (2013.01)

(58) Field of Classification Search
CPC ........ B25J 9/1615; B25J 9/0093; B25J 9/026; B65G 1/1376; B65G 1/1378; B65G 47/92; B65G 47/905
See application file for complete search history.

(56) References Cited

U.S. PATENT DOCUMENTS

| 10,906,740 B2 * | 2/2021 | Wagner .................. B07C 3/008 |
| 11,407,589 B2 * | 8/2022 | Wagner .................. G05B 19/41 |

(Continued)

FOREIGN PATENT DOCUMENTS

| CN | 108516134 A | 9/2018 |
| EP | 2233400 A1 | 9/2010 |

(Continued)

*Primary Examiner* — Kaitlin S Joerger
(74) *Attorney, Agent, or Firm* — The Webb Law Firm

(57) ABSTRACT

In an article transfer facility, a drive portion includes a first Z-axis drive portion configured to move a holding portion in a Z direction, a first X-axis drive portion configured to move the holding portion in an X direction, a first Y-axis drive portion configured to move the holding portion in a Y direction, and a second X-axis drive portion configured to move a placement portion in the X direction. A control portion executes first control in which an article at a first position is placed on the placement portion, and second control in which the article placed on the placement portion is arranged at a second position. In the first control, the drive portion is controlled such that the holding portion picks up the article at the first position and moves to a position on an upper side of the placement portion, and thereafter releases the article to place the article on the placement portion.

10 Claims, 14 Drawing Sheets

(51) Int. Cl.
  *B65G 47/90*  (2006.01)
  *B65G 47/91*  (2006.01)
  *B25J 9/02*  (2006.01)

(56) References Cited

U.S. PATENT DOCUMENTS

| | | | |
|---|---|---|---|
| 11,472,633 B2* | 10/2022 | Wagner | B65G 43/08 |
| 2006/0091842 A1 | 5/2006 | Nishiyama | |
| 2007/0239315 A1 | 10/2007 | Sato et al. | |
| 2018/0201450 A1 | 7/2018 | Koike et al. | |
| 2018/0273297 A1* | 9/2018 | Wagner | B65G 47/82 |
| 2018/0273298 A1* | 9/2018 | Wagner | B25J 9/1615 |
| 2019/0256301 A1 | 8/2019 | Hashimoto et al. | |
| 2019/0270537 A1* | 9/2019 | Amend, Jr. | B65G 1/1378 |
| 2019/0337723 A1* | 11/2019 | Wagner | B65G 47/962 |
| 2022/0009090 A1* | 1/2022 | Morikubo | B25J 9/16 |
| 2023/0123724 A1* | 4/2023 | Allen | B25J 9/1669 |
| | | | 705/333 |

FOREIGN PATENT DOCUMENTS

| | | | |
|---|---|---|---|
| JP | 594480 A | 1/1984 | |
| JP | 881053 A | 3/1996 | |
| JP | 2006124122 A | 5/2006 | |
| JP | 200798501 A | 4/2007 | |
| JP | 5237856 B2 | 4/2013 | |
| JP | 2017218267 A | 12/2017 | |
| JP | 201876178 A | 5/2018 | |
| JP | 2018115076 A | 7/2018 | |
| KR | 1020100087922 A | 8/2010 | |
| WO | 2006006624 A1 | 1/2006 | |

\* cited by examiner

ARTICLE TRANSFER FACILITY

CROSS-REFERENCE TO RELATED APPLICATIONS

This application is the United States national phase of International Application No. PCT/JP2019/036553 filed Sep. 18, 2019, and claims priority to Japanese Patent Application No. 2018-205276 filed Oct. 31, 2018, the disclosures of which are hereby incorporated by reference in their entirety.

BACKGROUND OF THE INVENTION

Field of the Invention

The present invention relates to an article transfer facility for transferring an article from a first position to a second position.

Description of Related Art

Patent Document 1 listed below discloses an article transfer facility that includes a robot arm (picking robot 5) for transferring an article from a first container (single item pallet Ta) at a first position to a second container (sorting pallet Tb) at a second position. Note that the names and reference signs for members shown in parentheses in the description of the background technology are those used in Patent Document 1.

The article transfer facility of Patent Document 1 is configured such that the robot arm (picking robot 5) picks up an article stored in the first container (single item pallet Ta) and stores the held article to the second container (sorting pallet Tb).

For this reason, in the article transfer facility of Patent Document 1, until the held article is stored in the second container (sorting pallet Tb), the next article that is to be stored in the second container (sorting pallet Tb) cannot be taken out of the first container (single item pallet Ta) by the robot arm (picking robot 5). As a result, when a large number of articles are to be transferred, there is a problem that the time required for the transfer work tends to be long.

Patent Document 1: JP 5237856B (paragraph 0019, FIG. 3)

SUMMARY OF THE INVENTION

In view of this, there is desire for the realization of an article transfer facility that is capable of shortening the time required for article transfer work.

In view of the foregoing, an article transfer facility according to a characteristic configuration is an article transfer facility for transferring an article from a first position to a second position, the article transfer facility including:
a holding portion configured to hold the article;
a placement portion on which the article is to be placed;
a drive portion configured to move the holding portion and the placement portion; and
a control portion configured to control the drive portion,
wherein letting a predetermined reference direction be a Z direction, one of two directions that are orthogonal to each other in a view along the Z direction be an X direction, and another one of the two directions be a Y direction,
the drive portion includes
a first Z-axis drive portion configured to move and guide the holding portion in the Z direction,
a first X-axis drive portion configured to move and guide the holding portion in the X direction,
a first Y-axis drive portion configured to move and guide the holding portion in the Y direction, and
a second X-axis drive portion configured to move and guide the placement portion in the X direction,
the control portion executes first control in which the article at the first position is placed on the placement portion, and second control in which the article placed on the placement portion is arranged at the second position, and
in the first control, the drive portion is controlled such that the holding portion picks up the article at the first position and moves to a position above the placement portion, and thereafter releases the article to place the article on the placement portion.

According to this characteristic configuration, in the first control, the holding portion picks up the article at the first position and places the article on the placement portion. For this reason, after placing the article on the placement portion, the holding portion can immediately start moving toward the first position in order to pick up the next article. Accordingly, the time required for article transfer can be reduced compared with a configuration in which the holding portion transfers an article from the first position to the second position on its own.

Also, according to this configuration, the drive portion includes the first Z-axis drive portion, the first X-axis drive portion, the first Y-axis drive portion, and the second X-axis drive portion. In other words, the drive portion is configured as a so-called Cartesian coordinate robot in which the drive portion moves and guides the holding portion in the mutually orthogonal X, Y, and Z directions, and also moves and guides the placement portion in the X direction. Accordingly, the drive portion can have a simpler configuration than a robot arm that has a plurality of joints, for example. Therefore, the manufacturing cost of the article transfer facility can be kept low.

DESCRIPTION OF THE INVENTION

1. First Embodiment

Figure 1:
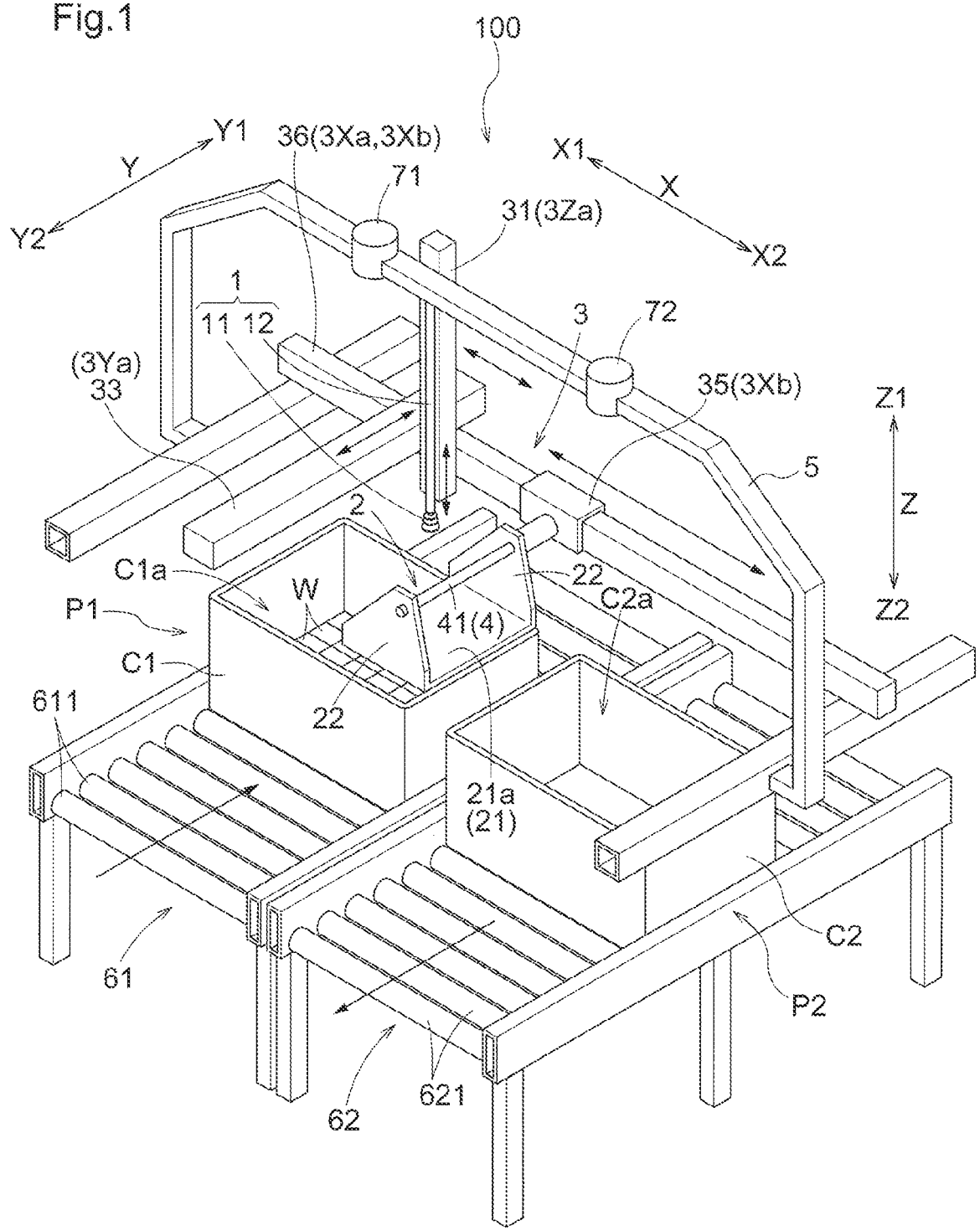
FIG. 1 is a perspective view of an article transfer facility according to a first embodiment.

An article transfer facility 100 according to a first embodiment will be described below with reference to the drawings. The article transfer facility 100 is configured to transfer an article W from a first position P1 to a second position P2.

Note that in the following description, "Z direction" refers to a predetermined reference direction, "X direction" refers to one of two directions that are orthogonal to each other in a view along the Z direction, and "Y direction" refers to the other direction. The X direction, the Y direction, and the Z direction are respectively indicated by arrows denoted by "X", "Y", and "Z" in the drawings. Note that in the present embodiment, the Z direction matches the vertical direction, the upper side in the vertical direction will be referred to as "upper side Z1", and the lower side in the vertical direction will be referred to as "lower side Z2". The upper side Z1 corresponds to "first Z-direction side," which is one side in the Z direction.

Also, one side in the X direction will be referred to as "first X-direction side X1", and the other side will be referred to as "second X-direction side X2". Further, one side in the Y direction will be referred to as "first Y-direction side Y1", and the other side will be referred to as "second Y-direction side Y2". Note that in the present embodiment, the first position P1 and the second position P2 are arranged side-by-side in the X direction. Also, the first position P1 is arranged on the first X-direction side X1, and the second position P2 is arranged on the second X-direction side X2.

As shown in FIG. 1, in the present embodiment, the article transfer facility 100 performs an article W transfer operation such that an article W stored in a first container C1 at the first position P1 is transferred to and stored in a second container C2 at the second position P2.

The first container C1 has a first opening C1a formed on the upper side Z1. In the present embodiment, the first container C1 is formed in a rectangular parallelepiped shape with an open surface on the upper side Z1. Also, the first container C1 is arranged at the first position P1 such that the long sides and the short sides respectively extend along the X direction and the Y direction in a view along the Z direction. The second container C2 has a second opening C2a formed on the upper side Z1. In the present embodiment, similarly to the first container C1, the second container C2 is also formed in a rectangular parallelepiped shape with an open surface on the upper side Z1. The second container C2 is arranged at the second position P2 such that the long sides and the short sides respectively extend along the X direction and the Y direction in a view along the Z direction.

As shown in FIG. 1, the article transfer facility 100 has a holding portion 1 for holding an article W, a placement portion 2 on which the article W is placed, and a drive portion 3 for moving the holding portion 1 and the placement portion 2.

In the present embodiment, the holding portion 1 has a suction pad 11 and a support 12 that supports the suction pad 11. The suction pad 11 is configured to be able to switch between a suction state of suctioning the article W and a non-suction state of not suctioning the article W. The suction pad 11 suctions the article W by coming into contact with the article W and creating negative pressure in the space between the suction pad 11 and the article W. The suction pad 11 is supported by the support 12 so as to be able to rotate about an axis extending along a virtual plane orthogonal to the Z direction. The support 12 is formed in a columnar shape having an axial center that extends in the Z direction. The suction pad 11 is attached to the end face of the support 12 that is on the lower side Z2. In the present embodiment, the holding portion 1 holds the article W by causing the suction pad 11 to suction the surface of the article W that is on the upper side Z1.

The placement portion 2 has a main body portion 21 that has a placement surface 21a for placement of the article W. The main body portion 21 is plate-shaped and has the placement surface 21a that is formed on one surface of the main body portion 21. In the present embodiment, the placement surface 21a is shaped as a rectangular flat surface. Further, the Y-direction size of the placement surface 21a is set to be less than or equal to the Y-direction size of the bottom surface of the second container C2 on which the article W is placed. However, if the Y-direction size of the placement surface 21a is set to be approximately the same as the Y-direction size of the bottom surface of the second container C2, it is not necessary to move the placement portion 2 in the Y direction, which is preferable. In the illustrated example, the Y-direction size of the placement surface 21a is slightly smaller than the Y-direction size of the bottom surface on which the article W is placed in the second container C2 (see FIG. 8). Also, in the present embodiment, a pair of coupling portions 22 are provided at respective Y-direction ends of the placement surface 21a and rise therefrom in a direction orthogonal to the placement surface 21a.

As shown in FIG. 1, the article transfer facility 100 further includes an unloading portion 4 that moves the placement portion 2 such that the article W placed on the placement portion 2 is unloaded directly from the placement portion 2. In the present embodiment, the unloading portion 4 has a rotation shaft 41 that is coupled to the pair of coupling portions 22, and a rotational driving force source 42 (see FIG. 2) that causes the rotation shaft 41 to rotate around the axis thereof.

The rotation shaft 41 extends along a virtual plane that is orthogonal to the Z direction. In the present embodiment, the rotation shaft 41 extends in the Y direction. The rotation shaft 41 is coupled to portions of the pair of coupling portions 22 that are distant from the placement surface 21a. As the rotation shaft 41 rotates due to driving force from the rotational driving force source 42, the pair of coupling portions 22 and the main body portion 21 rotate around the rotation shaft 41. In other words, the unloading portion 4 rotates the placement portion 2 around the rotation shaft 41. As a result, the placement surface 21a becomes tilted with respect to the horizontal plane, and the article W placed on the placement surface 21a can slide along the tilted placement surface 21a and be unloaded from the placement portion 2.

The drive portion 3 has a first Z-axis drive portion 3Za that moves and guides the holding portion 1 in the Z direction, a first X-axis drive portion 3Xa that moves and guides the holding portion 1 in the X direction, a first Y-axis drive portion 3Ya that moves and guides the holding portion in the Y direction, and a second X-axis drive portion 3Xb that moves and guides the placement portion 2 in the X direction. In other words, the drive portion 3 is configured as a so-called Cartesian coordinate robot that moves and guides the holding portion 1 in the mutually orthogonal X, Y, and Z directions, and also moves and guides the placement portion 2 in the X direction.

Figure 2:
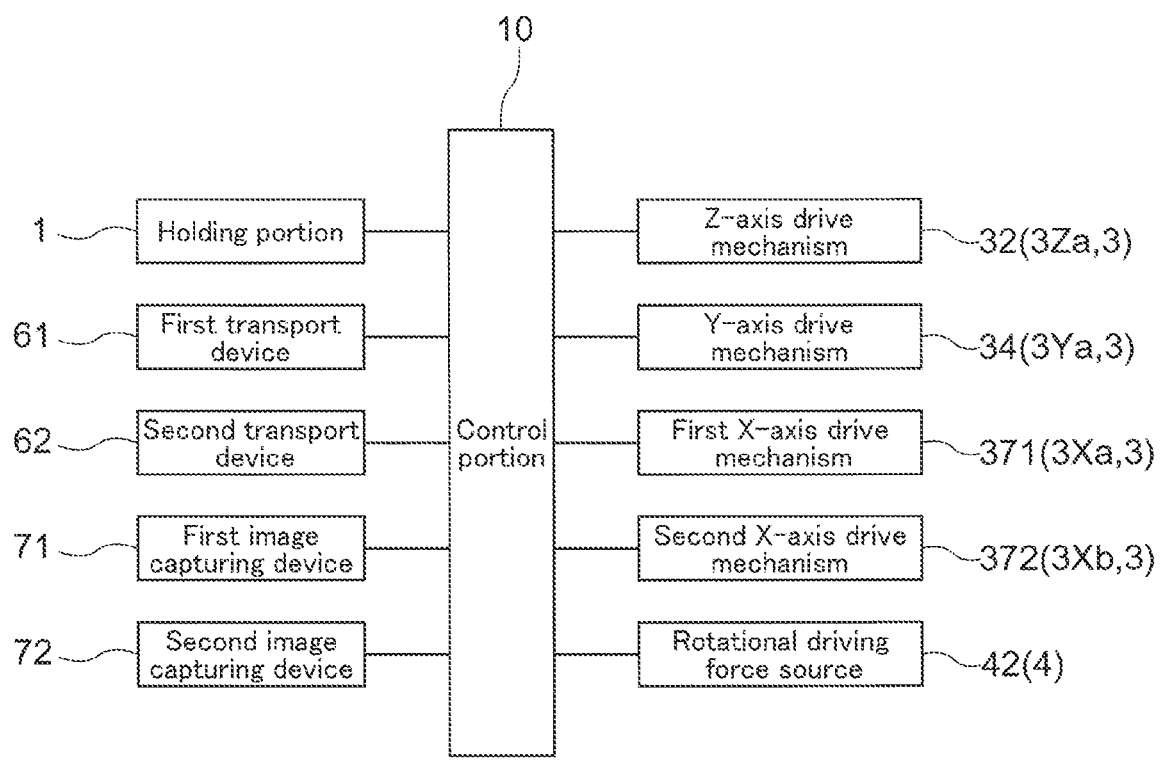
FIG. 2 is a control block diagram of the article transfer facility according to the first embodiment.

As shown in FIGS. 1 and 2, in the present embodiment, the drive portion 3 includes a Z-axis guide body 31 that guides the holding portion 1 in the Z direction, a Z-axis drive mechanism 32 that moves the holding portion 1 in the Z direction, a Y-axis guide body 33 that guides the Z-axis guide body 31 in the Y direction, a Y-axis drive mechanism 34 that moves the Z-axis guide body 31 in the Y direction, an X-axis moving body 35 that is coupled to the placement portion 2 via the rotation shaft 41, an X-axis guide body 36 that guides the Y-axis guide body 33 and the X-axis moving body 35 in the X direction, a first X-axis drive mechanism 371 that moves the Y-axis guide body 33 in the X direction, and a second X-axis drive mechanism 372 that moves the X-axis moving body 35 in the X direction.

The Z-axis guide body 31 is a rail member that extends in the Z direction. The support 12 of the holding portion 1 is attached to the Z-axis guide body 31 so as to be movable in the Z direction. In the present embodiment, the Z-axis drive mechanism 32 has a Z-axis ball screw that extends in the Z direction and is mated to the support 12, and a Z-axis motor for rotating the Z-axis ball screw (neither being shown). By rotating the Z-axis ball screw with use of the Z-axis motor, the Z-axis drive mechanism 32 causes the support 12, which is supported by the Z-axis guide body 31, to move in the Z direction. In this way, in the present embodiment, the Z-axis guide body 31 and the Z-axis drive mechanism 32 function as the first Z-axis drive portion 3Za that moves and guides the holding portion 1 in the Z direction.

The Y-axis guide body 33 is a rail member that extends in the Y direction. The Y-axis guide body 33 is arranged on the first X-direction side X1 of the Z-axis guide body 31. The Z-axis guide body 31 is attached to the Y-axis guide body 33 so as to be movable in the Y direction. In the present embodiment, the Y-axis drive mechanism 34 has a Y-axis ball screw that extends in the Y direction and is mated to the Z-axis guide body 31, and a Y-axis motor for rotating the Y-axis ball screw (neither being shown). By rotating the Y-axis ball screw with use of the Y-axis motor, the Y-axis drive mechanism 34 causes the Z-axis guide body 31, which is supported by the Y-axis guide body 33, to move in the Y direction. In this way, in the present embodiment, the Y-axis guide body 33 and the Y-axis drive mechanism 34 function as the first Y-axis drive portion 3Ya that moves and guides the holding portion 1 in the Y direction.

The X-axis guide body 36 is a rail member that extends in the X direction. The X-axis guide body 36 is supported by a support frame 5 that is fixed at a predetermined position. In this example, the X-axis guide body 36 is arranged on the lower side Z2 of the Y-axis guide body 33. The Y-axis guide body 33 is attached to the X-axis guide body 36 so as to be movable in the X direction. In the present embodiment, the first X-axis drive mechanism 371 has a first X-axis ball screw that extends in the X direction and is mated to the Y-axis guide body 33, and a first X-axis motor for rotating the first X-axis ball screw (neither being shown). By rotating the first X-axis ball screw with use of the first X-axis motor, the first X-axis drive mechanism 371 causes the Y-axis guide body 33, which is supported by the X-axis guide body 36, to move in the X direction. In this way, in the present embodiment, the X-axis guide body 36 and the first X-axis drive mechanism 371 function as the first X-axis drive portion 3Xa that moves and guides the holding portion 1 in the X direction.

The X-axis moving body 35 is attached to the X-axis guide body 36 so as to be movable in the X direction. The X-axis moving body 35 is arranged on the second X-direction side X2 of the Y-axis guide body 33. The placement portion 2 is arranged on the second Y-direction side Y2 of the X-axis moving body 35, and the placement portion 2 is attached to the X-axis moving body 35 so as to be capable of rotating around the rotation shaft 41. In the present embodiment, the second X-axis drive mechanism 372 has a second X-axis ball screw that extends in the X direction and is mated to the X-axis moving body 35, and a second X-axis motor for rotating the second X-axis ball screw (neither being shown). By rotating the second X-axis ball screw with use of the second X-axis motor, the second X-axis drive mechanism 372 causes the X-axis moving body 35, which is supported by the X-axis guide body 36, to move in the X direction. In this way, in the present embodiment, the X-axis moving body 35, the X-axis guide body 36, and the second X-axis drive mechanism 372 function as the second X-axis drive portion 3Xb that moves and guides the placement portion 2 in the X direction.

In the present embodiment, the article transfer facility 100 includes a first transport device 61 for transporting the first container C1, and a second transport device 62 for transporting the second container C2.

The first transport device 61 transports the first container C1 toward the first Y-direction side Y1 along a transport path that passes through the first position P1. In the present embodiment, the Y direction corresponds to a "transport direction" that intersects the Z direction, and the first Y-direction side Y1 corresponds to a "first transport-direction side," which is one side in the transport direction. The first transport device 61 transports the first container C1, which is at the first position P1, from the first position P1 toward the first Y-direction side Y1, and also transports another first container C1, which is different from the aforementioned first container C1, from the second Y-direction side Y2 to the first position P1. At least one article W is stored in the first container C1 that is transported from the second Y-direction side Y2 to the first position P1 by the first transport device 61. In the illustrated example, the first transport device 61 is a roller conveyor having a rotation shaft that extends along the X direction and having a plurality of first rollers 611 that are arranged at regular intervals in the Y direction.

The second transport device 62 transports the second container C2 toward the second Y-direction side Y2 along a transport path that passes through the second position P2. The second transport device 62 transports the second container C2 at the second position P2 from the second position P2 toward the second Y-direction side Y2, and also transports another second container C2, which is different from the aforementioned second container C2, from the first Y-direction side Y1 to the second position P2. In the illustrated example, the second transport device 62 is a roller conveyor having a rotation shaft that extends along the X direction and having a plurality of second rollers 621 that are arranged at regular intervals in the Y direction.

Also, in the present embodiment, the article transfer facility 100 includes a first image capturing device 71 and a second image capturing device 72. The first image capturing device 71 is arranged on the upper side Z1 of the first container C1 at the first position P1, and captures images of the inside of the first container C1 at the first position P1 through the first opening C1a. The second image capturing device 72 is arranged on the upper side Z1 of the second container C2 at the second position P2, and captures images of the inside of the second container C2 at the second position P2 through the second opening C2a.

In the illustrated example, the first image capturing device 71 and the second image capturing device 72 are supported by the support frame 5.

As shown in FIG. 2, the article transfer facility 100 includes a control portion 10 that controls the drive portion 3. In the present embodiment, the control portion 10 controls the Z-axis drive mechanism 32, the Y-axis drive mechanism 34, the first X-axis drive mechanism 371, and the second X-axis drive mechanism 372. Specifically, the control portion 10 controls the Z-axis motor of the Z-axis drive mechanism 32, the Y-axis motor of the Y-axis drive mechanism 34, the first X-axis motor of the first X-axis drive mechanism 371, and the second X-axis motor of the second X-axis drive mechanism 372.

Also, in the present embodiment, the control portion 10 controls constituent elements as follows.

Specifically, the control portion 10 controls the tilt angle of the placement surface 21a of the placement portion 2 by controlling the rotational driving force source 42 of the unloading portion 4. The control portion 10 controls the suction pad 11 of the holding portion 1 so as to switch between the suction state of suctioning the article W and the non-suction state of not suctioning the article W. The control portion 10 controls the first transport device 61 and the second transport device 62. Specifically, the control portion 10 controls a first roller drive source (not shown) that drives the first rollers 611 of the first transport device 61, and a second roller drive source (not shown) that drives the second rollers 621 of the second transport device 62. The control portion 10 controls the first image capturing device 71 and the second image capturing device 72. Based on captured image information transmitted by the first image capturing device 71, the control portion 10 recognizes the position and orientation of the first container C1 at the first position P1, as well as the state of the inside of the first container C1 (e.g., the presence/absence of an article W, and the position and orientation of an article W). Further, based on captured image information transmitted by the second image capturing device 72, the control portion 10 recognizes the position and orientation of the second container C2 at the second position P2, as well as the state of the inside of the second container C2 (e.g., the presence/absence of an article W, and the position and orientation of an article W).

The control portion 10 executes first control for placing the article W at the first position P1 on the placement portion 2 and second control for moving the article W from the placement portion 2 to the second position. In the first control, the control portion 10 controls the drive portion 3 such that the holding portion 1 picks up the article W at the first position P1 and moves to a position on the upper side Z1 of the placement portion 2, and then releases the article W and places the article W on the placement portion 2.

Hereinafter, the first control and the second control executed by the control portion 10 of the present embodiment will be described with reference to FIGS. 3 to 8. For convenience in the following description, there is one article W housed in each of the first container C1 and the second container C2.

Figure 3:
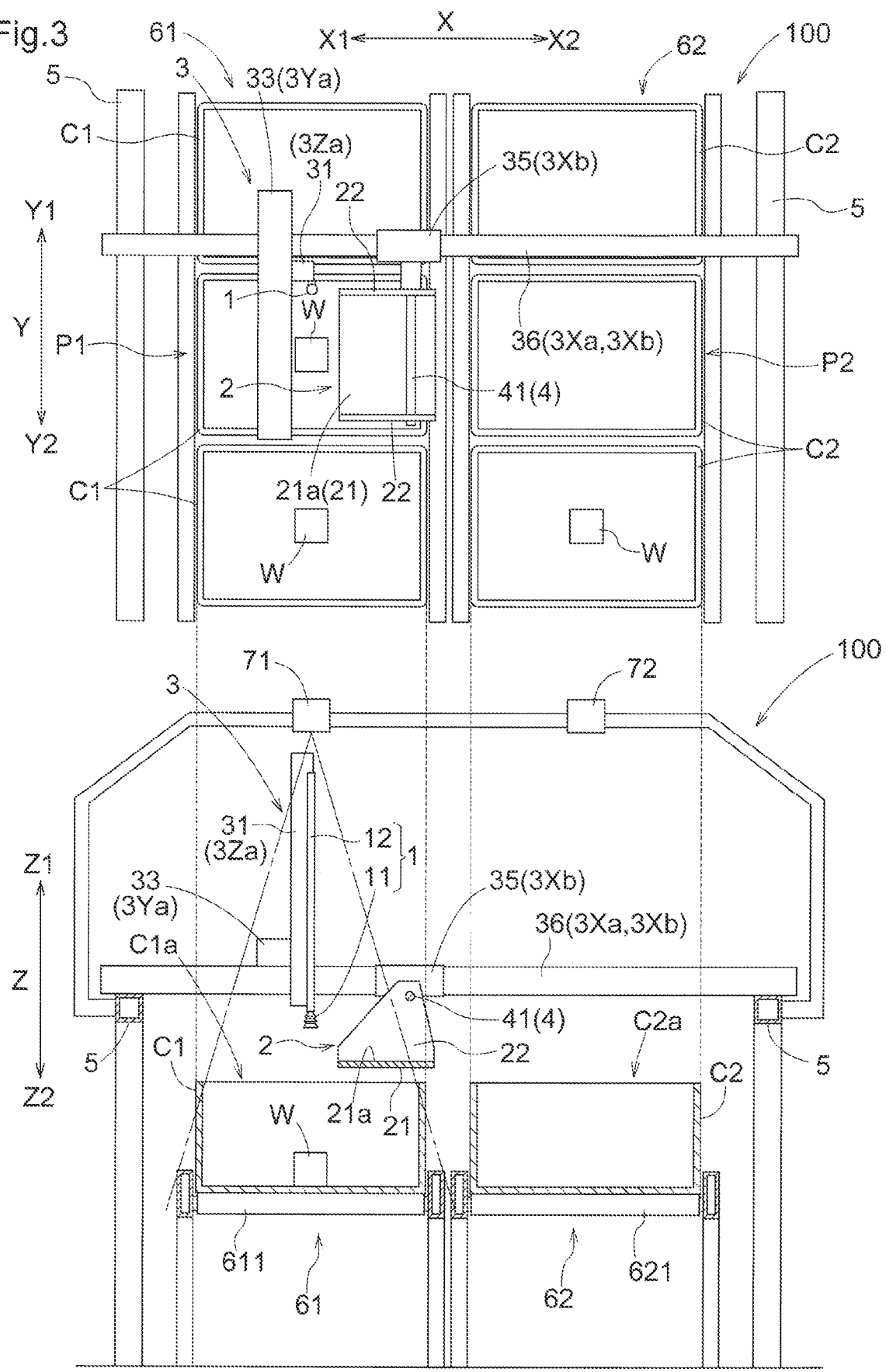
FIG. 3 is a plan view and a front view showing first control performed by a control portion according to the first embodiment.

FIG. 3 shows an example of the initial state of the article transfer facility 100 before the start of the first control according to the present embodiment. In this state, an article W is stored in the first container C1 at the first position P1, and an article W is not stored in the second container C2 at the second position P2. Also, the placement surface 21a of the placement portion 2 is horizontal. Further, the holding portion 1 and the placement portion 2 are arranged close to each other in the X direction, and are arranged at positions overlapping the first container C1 at the first position P1 in a view along the Z direction. Here, saying that two elements are "overlapped in a view along a certain direction" means that when a virtual straight line that is parallel to the line-of-sight direction is moved in any direction orthogonal to the virtual straight line, there is a region in which the virtual straight line intersects both of the two members.

In the first control, the first image capturing device 71 captures images of the inside of the first container C1 at the first position P1 through the first opening C1a. If, based on captured image information from the first image capturing device 71, the control portion 10 determines that an article W to be transferred to the second container C2 exists in the first container C1 at the first position P1, the first control continues. Note that in a case of determining that an article W to be transferred to the second container C2 does not exist in the first container C1 at the first position P1, the control portion 10 controls the first transport device 61 to supply a new first container C1 to the first position P1, for example.

Figure 4:
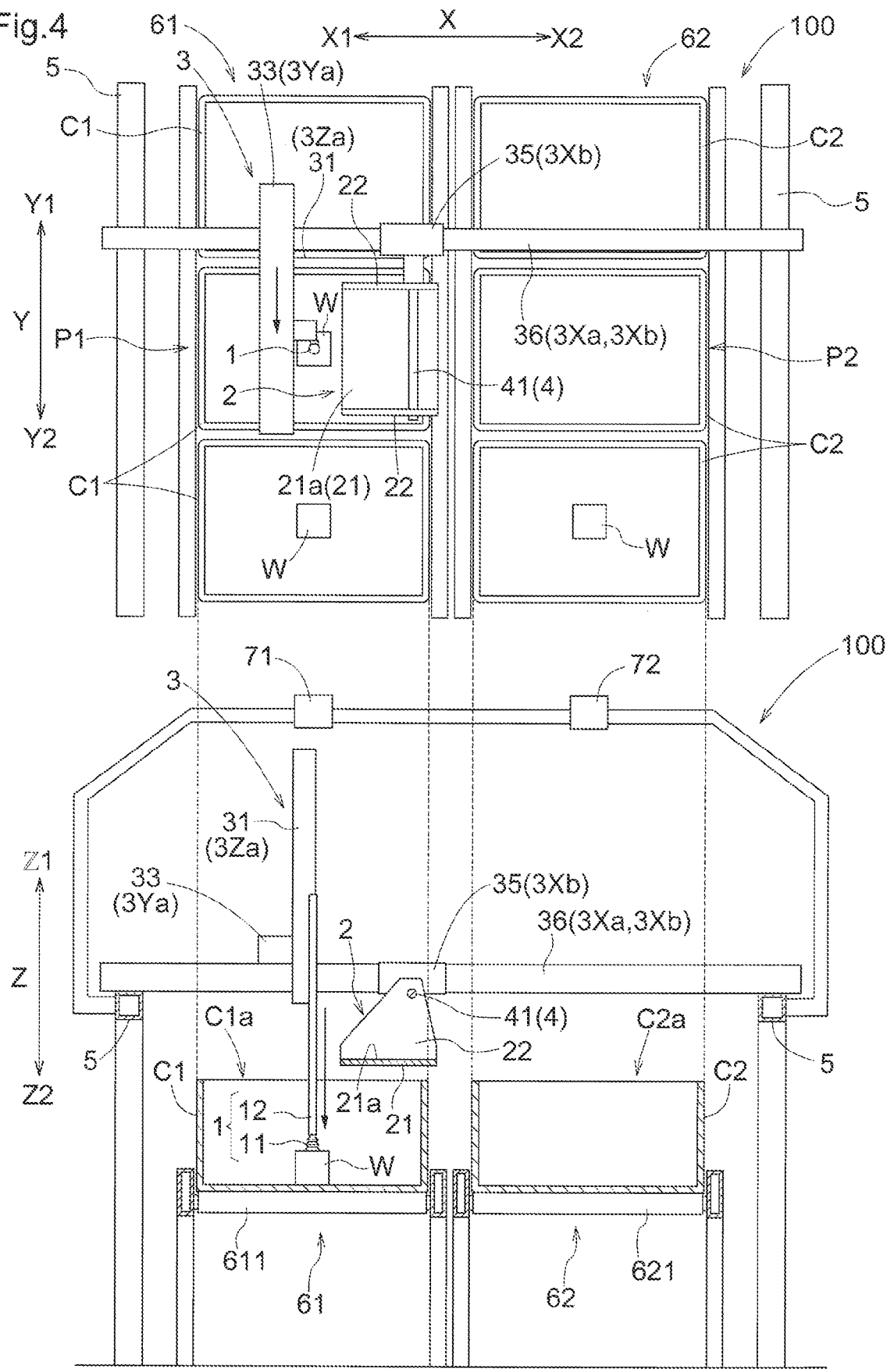
FIG. 4 is a plan view and a front view showing the first control performed by the control portion according to the first embodiment.

As shown in FIG. 4, in the first control, the drive portion 3 is driven such that the suction pad 11 of the holding portion 1 overlaps the article W in the first container C1 at the first position P1 in a view along the Z direction. In the illustrated example, the X-direction position of the suction pad 11 in the initial state is the same as the X-direction position of the suction pad 11 when it overlaps the article W in the first container C1 at the first position P1 in a view along the Z direction. Therefore, in the illustrated example, the Z-axis guide body 31 moves toward the second Y-direction side Y2 such that the suction pad 11 overlaps the article W in the first container C1 at the first position P1 in a view along the Z direction. Thereafter, the support 12 moves toward the lower side Z2 of the Z-axis guide body 31 until the suction pad 11 reaches a position where the surface of the article W on the upper side Z1 can be suctioned, and then the suction pad 11 enters the suction state. In this way, the holding portion 1 picks up the article W of the first container C1 at the first position P1.

Figure 5:
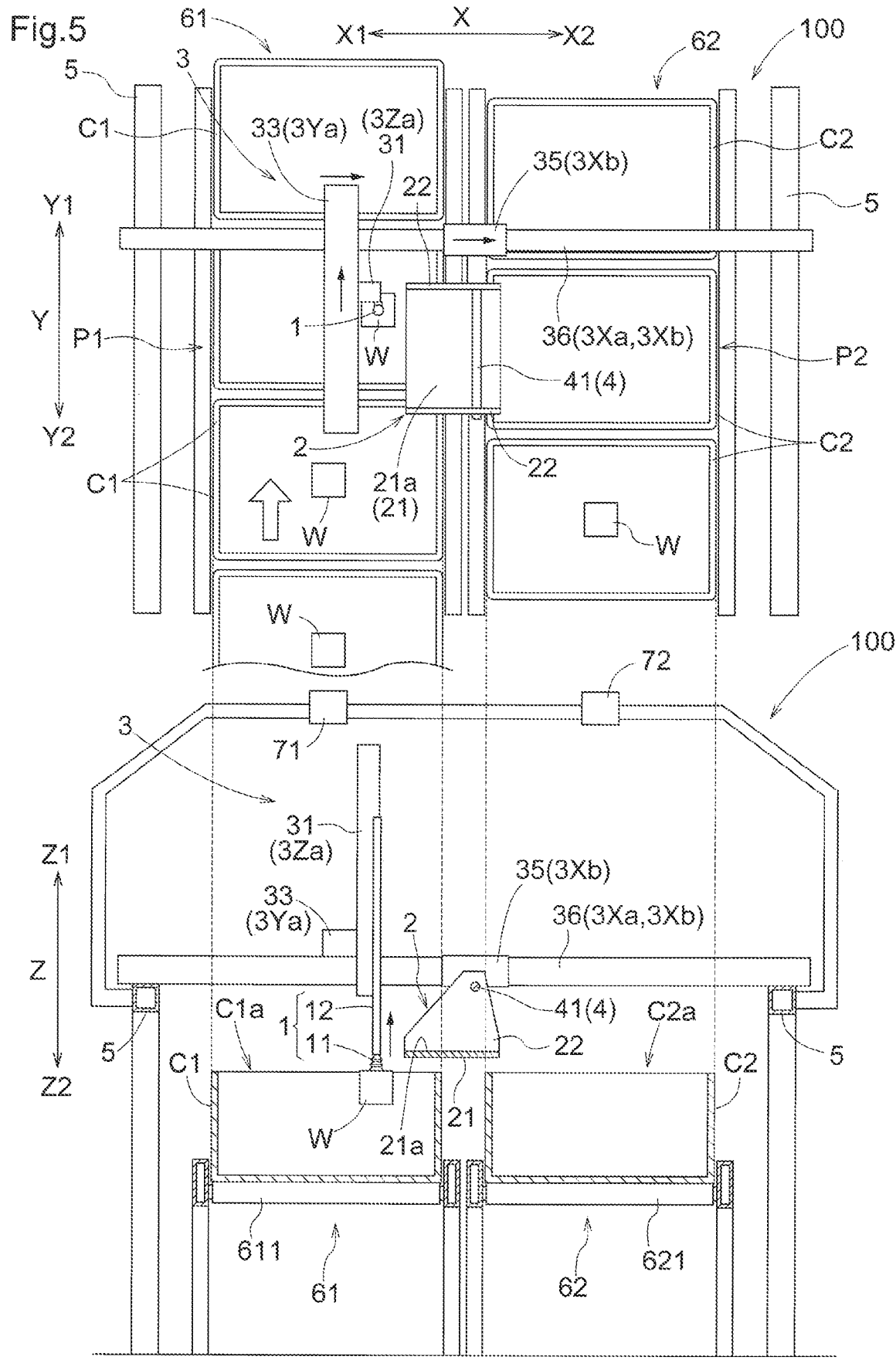
FIG. 5 is a plan view and a front view showing the first control performed by the control portion according to the first embodiment.

As shown in FIG. 5, after the holding portion 1 picks up the article W in the first container C1 at the first position P1, the first transport device 61 starts to transport the first container C1 toward the first Y-direction side Y1. At the same time, the support 12 moves toward the upper side Z1 of the Z-axis guide body 31, and moves the article W being suctioned by the suction pad 11 toward the upper side Z1.

The support 12 moves toward the upper side Z1 until the article W being suctioned by the suction pad 11 is located on the upper side Z1 of the placement surface 21a of the placement portion 2. Note that after the article W is taken out of the first container C1, when the next first container C1 adjacent thereto on the second Y-direction side Y2 has been transported to the first position P1, the first transport device 61 stops transporting the first container C1.

At this time, in the present embodiment, in addition to the movement of the support 12 toward the upper side Z1, the Z-axis guide body 31 moves toward the first Y-direction side Y1, and the article W being suctioned by the suction pad 11 is moved toward the first Y-direction side Y1. As described above, in the present embodiment, in the first control, after the article W is picked up by the holding portion 1, the control portion 10 controls the first transport device 61 to transport the first container C1 toward the first Y-direction side Y1, and also controls the drive portion 3 such that the holding portion 1 moves toward the first Y-direction side Y1 while also moving toward the upper side Z1 when retrieving the article W from the first container C1. Accordingly, even if the first container C1 is transported toward the first Y-direction side Y1 after the article W stored in the first container C1 at the first position P1 is picked up by the holding portion 1, it is possible to reduce the possibility that the article W being held by the holding portion 1 comes into contact with a portion of the first container C1 (here, the side wall portion that rises toward the upper side Z1 from the outer edge portion of the bottom surface on which the article W is placed in the first container C1).

Further, in the present embodiment, in addition to the movement of the support 12 toward the upper side Z1, the Y-axis guide body 33 moves toward the second X-direction side X2, and the X-axis moving body 35 also moves toward the second X-direction side X2 in synchronization with the Y-axis guide body 33. In this way, in the present embodiment, in the first control, the control portion 10 controls the drive portion 3 so as to move the holding portion 1, which is holding the article W, and the placement portion 2 toward the second position P2 in synchronization with each other, and also place the article W being held by the holding portion 1 on the placement portion 2.

Figure 6:
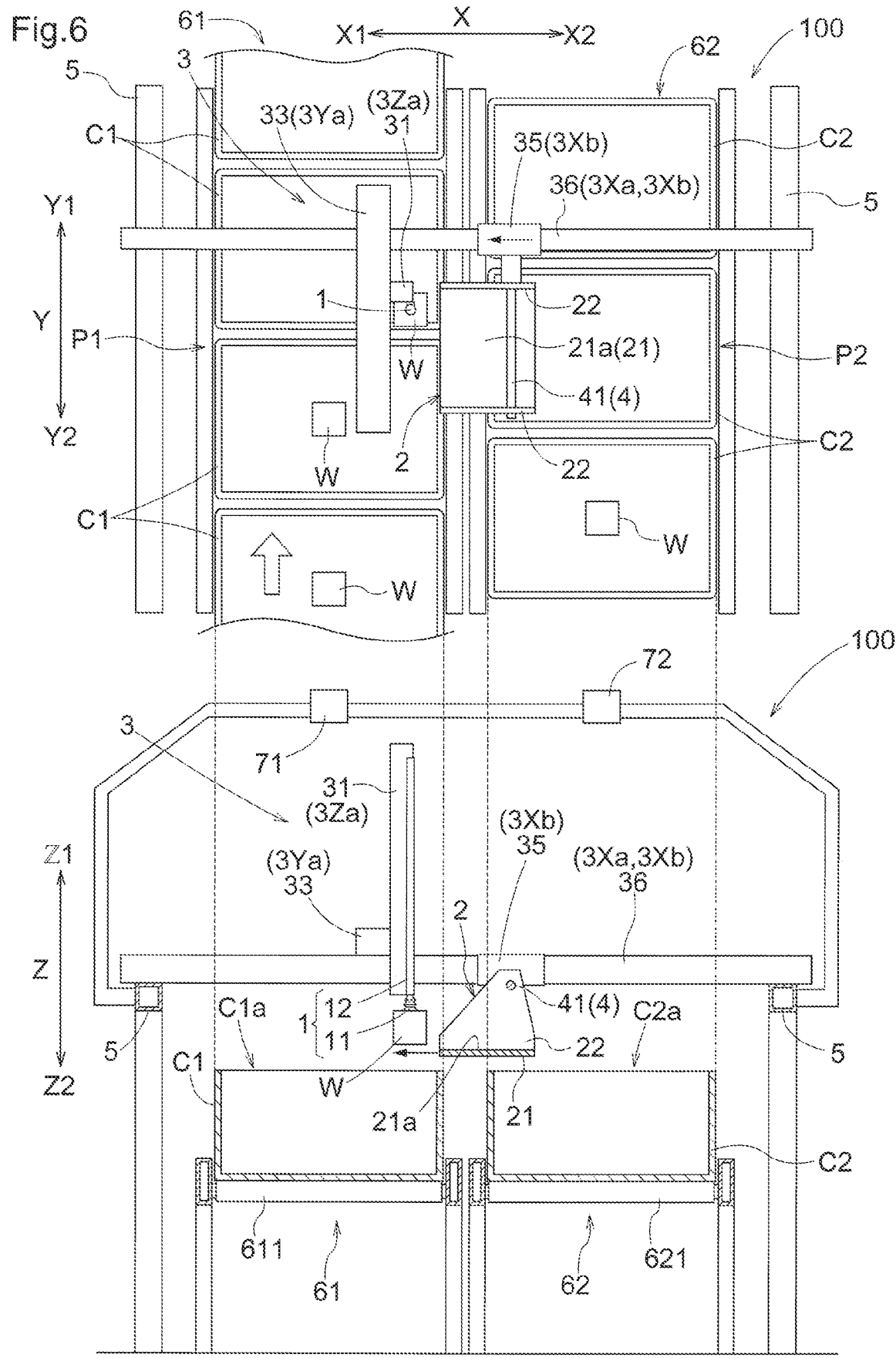
FIG. 6 is a plan view and a front view showing the first control performed by the control portion according to the first embodiment.
Figure 7:
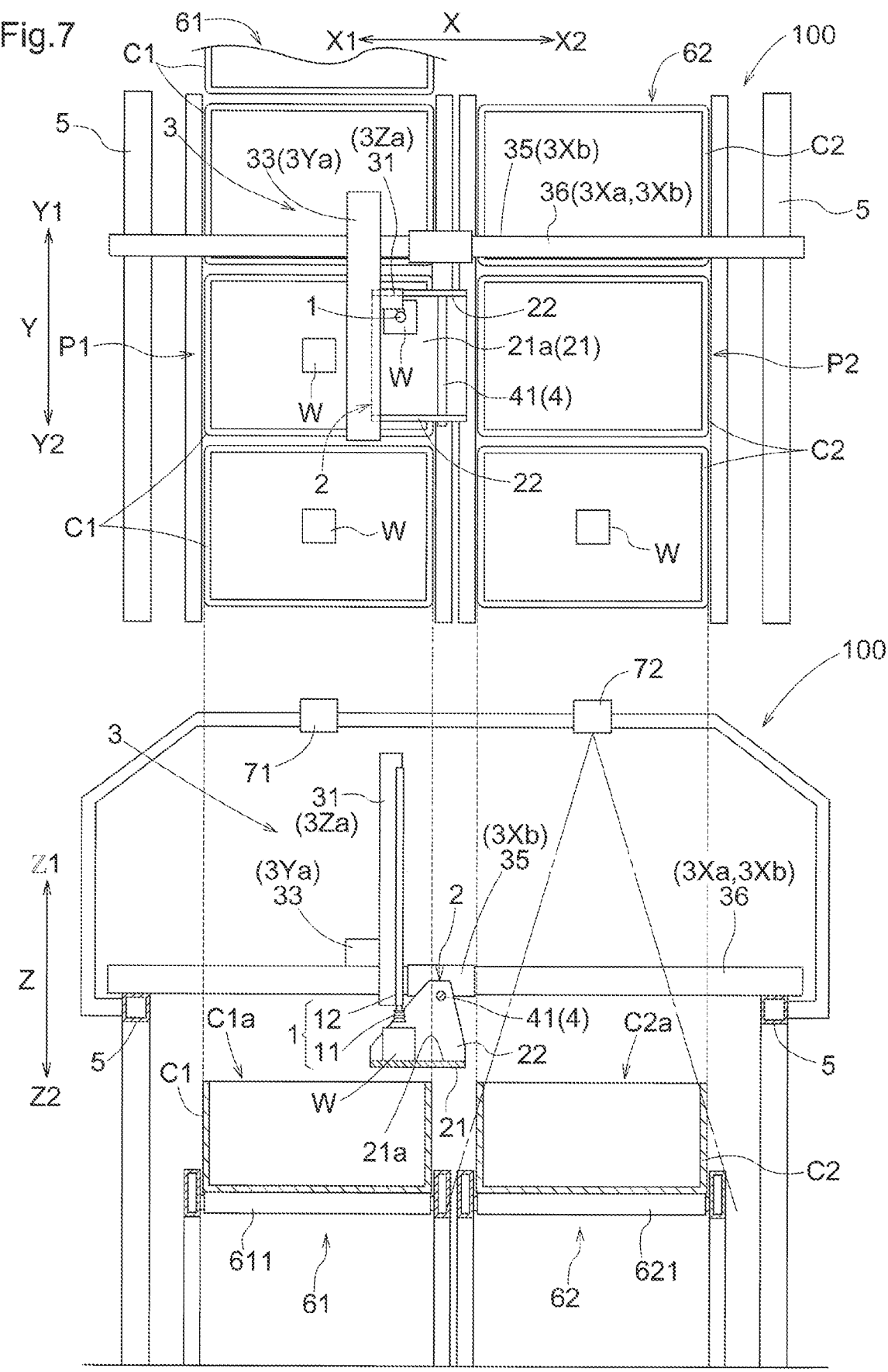
FIG. 7 is a plan view and a front view showing the first control performed by the control portion according to the first embodiment.

Subsequently, as shown in FIGS. 6 and 7, the X-axis moving body 35 moves toward the first X-direction side X1 such that the article W held by the holding portion 1 overlaps the placement surface 21a of the placement portion 2 in a view along the Z direction. Then, as shown in FIG. 7, the suction pad 11 enters the non-suction state, and the article W is released from the holding portion 1 and placed on the placement surface 21a of the placement portion 2.

Subsequently, the control portion 10 starts the second control for moving the article W from the placement portion 2 to the second position. In the second control, the second image capturing device 72 captures images of the inside of the second container C2 at the second position P2 through the second opening C2a. If, based on captured image information from the second image capturing device 72, the control portion 10 determines that the second container C2 at the second position P2 has a space for accommodating the article W (here, an article W does not exist in the second container C2 at the second position P2), the second control continues.

Figure 8:
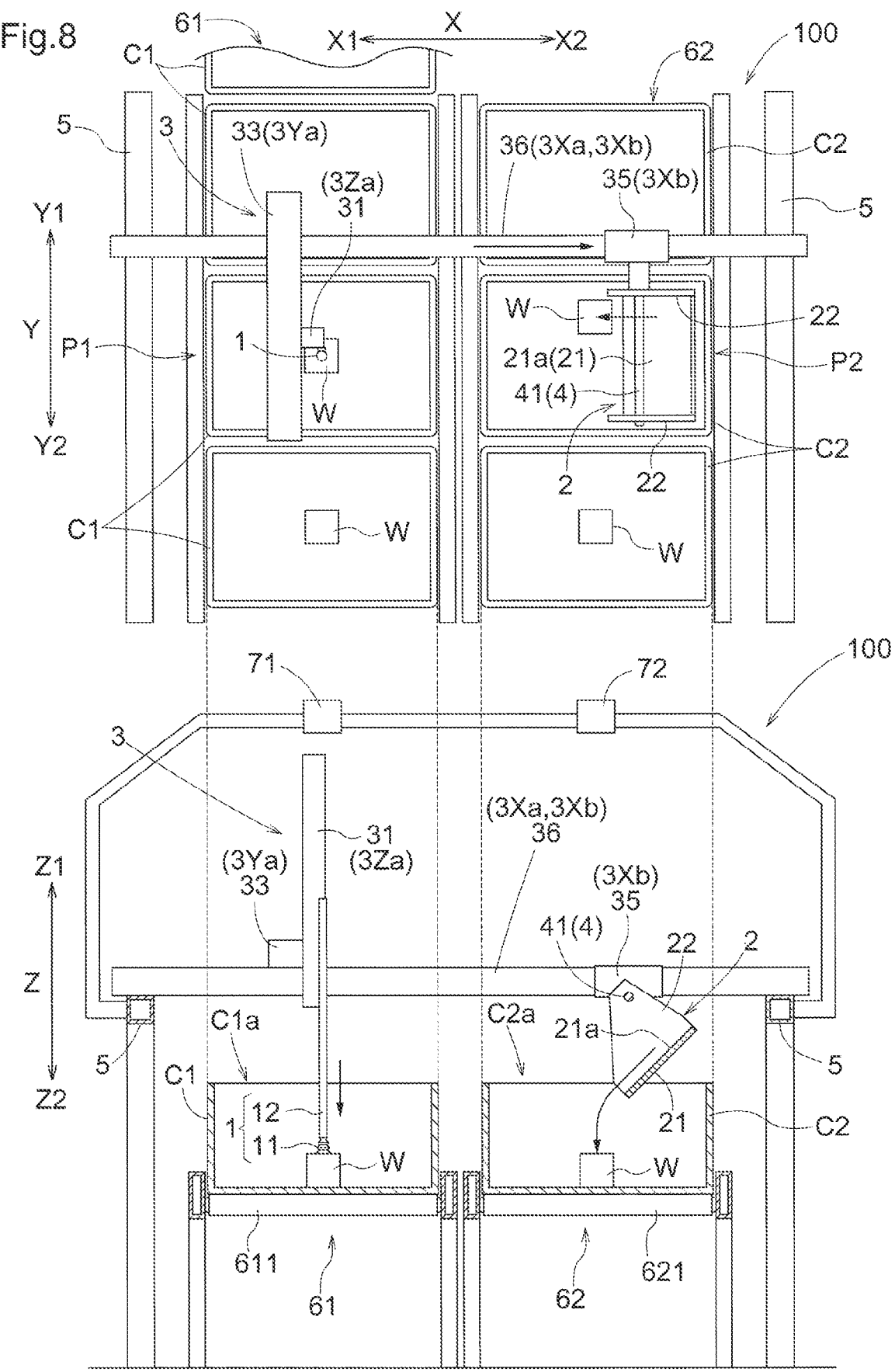
FIG. 8 is a plan view and a front view showing second control performed by the control portion according to the first embodiment.

As shown in FIG. 8, in the second control, the X-axis moving body 35 moves toward the second X-direction side X2 such that the article W placed on the placement portion 2 overlaps the bottom surface of the second container C2 at the second position P2 in a view along the Z direction.

Thereafter, the unloading portion 4 rotates the placement portion 2 around the rotation shaft 41 to tilt the placement surface 21a on which the article W is placed, such that the article W placed on the placement portion 2 is unloaded onto the bottom surface of the second container C2 at the second position P2. In this way, in the present embodiment, in the second control, the control portion 10 controls the drive portion 3 such that the placement portion 2 moves to a position on the upper side Z1 of the second position P2, and thereafter controls the unloading portion 4 such that the article W placed on the placement portion 2 is unloaded from the placement portion 2 to the second position P2. Thereafter, the control portion 10 controls the second transport device 62 to transport the second container C2 that contains the article W from the second position P2 toward the second Y-direction side Y2, and transport a new second container C2 from the first Y-direction side Y1 to the second position P2.

At the same time as the second control, the control portion 10 executes the first control such that an article W stored in a new first container C1 that was supplied to the first position P1 is moved to and placed on the placement portion 2. Preferably, the control portion 10 starts the next instance of the first control at the same time as the start of the second control. The control portion 10 repeatedly performs the control described above.

In the present embodiment, with respect to a central portion of the placement surface 21a in a direction that extends along the placement surface 21a and is orthogonal to the rotation shaft 41 (hereinafter, referred to as the "bias direction"), the rotation shaft 41 is arranged so as to biased to one bias direction side of the central portion. For this reason, by tilting the placement surface 21a so that the other side of the placement surface 21a in the bias direction is located on the lower side Z2 of the one side in the bias direction, the article W can slide down to a position close to the bottom surface of the second container C2 and is unloaded. As a result, it is possible to minimize the impact acting on the article W when the article W is unloaded to the second position P2. Note that the placement portion 2 may be configured to move in the Z direction.

As described above, in the present embodiment, the Y-direction size of the placement surface 21a is set to be the same as the Y-direction size of the bottom surface on which the article W is placed in the second container C2, thus eliminating the need to provide the drive portion 3 with a function for moving and guiding the placement portion 2 in the Y direction. In other words, according to this configuration, by controlling the position of the article W on the placement surface 21a in the Y direction, the control portion 10 can control the position of the article W that is to be unloaded onto the bottom surface of the second container C2 in the Y direction.

2. Second Embodiment

Hereinafter, an article transfer facility 100 according to a second embodiment will be described with reference to the drawings. In the present embodiment, the number of holding portions 1, the number of placement portions 2 and the structure thereof, and the structure of the drive portion 3 are different from the configuration in the first embodiment. Also, in the present embodiment, the unloading portion 4 is not provided, and the placement surface 21a of the placement portion 2 is fixed in a horizontal state. Further, in the present embodiment, the first transport device 61 and the second transport device 62 are not provided. The following description focuses on differences from the first embodiment. Note that configurations not particularly described below are deemed to be similar to those in the first embodiment.

Figure 9:
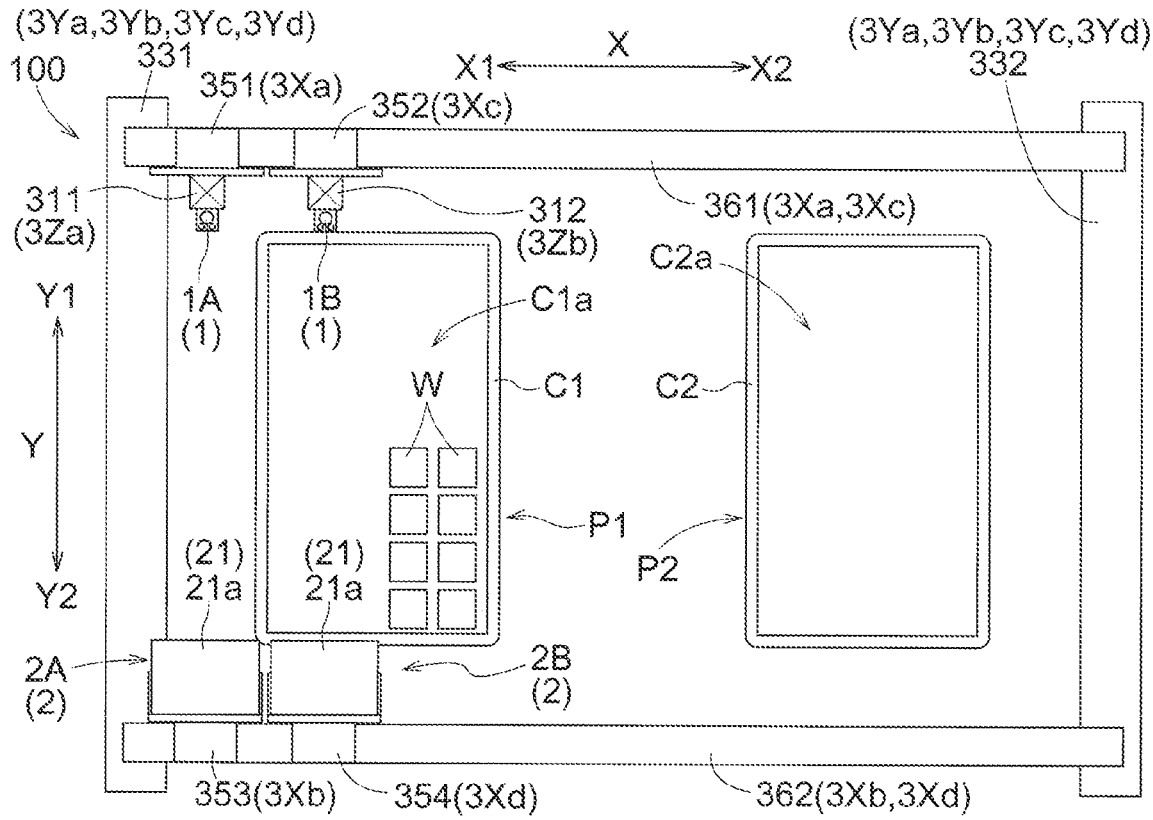
FIG. 9 is a plan view of an article transfer facility according to a second embodiment.

As shown in FIG. 9, in the present embodiment, the first container C1 is arranged at the first position P1 such that the long sides and the short sides respectively extend along the Y direction and the X direction in a view along the Z direction. The second container C2 is arranged at the second position P2 such that the long sides and the short sides respectively extend along the Y direction and the X direction in a view along the Z direction. Also, in the present embodiment, the Y-direction size of the placement surface 21a of the placement portion 2 is set to be smaller than the Y-direction size of the bottom surface of the second container C2 on which the article W is placed.

In the present embodiment, the article transfer facility 100 includes a pair of holding portions 1, a pair of placement portions 2, and the drive portion 3 for moving the pairs of portions. The pair of holding portions 1 are arranged side-by-side in the X direction, and the pair of placement portions 2 are also arranged side-by-side in the X direction. Note that although not shown, one of the holding portions 1 and one of the placement portions 2 may be arranged side-by-side in the X direction, and the other holding portion 1 and the other placement portion 2 may be arranged side-by-side in the X direction. In the following description, the holding portion 1 on the first X-direction side X1 will be referred to as the "first holding portion 1A", and the holding portion 1 on the second X-direction side X2 will be referred to as the "second holding portion 1B". Further, the placement portion 2 on the first X-direction side X1 will be referred to as the "first placement portion 2A", and the placement portion 2 on the second X-direction side X2 will be referred to as the "second placement portion 2B".

In the present embodiment, the drive portion 3 has a first Z-axis drive portion 3Za that moves and guides the first holding portion 1A in the Z direction, and a second Z-axis drive portion 3Zb that moves and guides the second holding portion 1B in the Z direction. Further, the drive portion 3 has a first X-axis drive portion 3Xa that moves and guides the first holding portion 1A in the X direction, a second X-axis drive portion 3Xb that moves and guides the first placement portion 2A in the X direction, a third X-axis drive portion 3Xc that moves and guides the second holding portion 1B in the X direction, and a fourth X-axis drive portion 3Xd that moves and guides the second placement portion 2B in the X direction. Further, the drive portion 3 includes a first Y-axis drive portion 3Ya that moves and guides the first holding portion 1A in the Y direction, a second Y-axis drive portion 3Yb that moves and guides the second holding portion 1B in the Y direction, a third Y-axis drive portion 3Yc that moves and guides the first placement portion 2A in the Y direction, and a fourth Y-axis drive portion 3Yd that moves and guides the second placement portion 2B in the Y direction. In other words, the drive portion 3 is configured as a so-called Cartesian coordinate robot in which the drive portion 3 moves and guides the first holding portion 1A and the second holding portion 1B in the X direction, the Y direction, and the Z direction, which are orthogonal to each other, and moves and guides the first placement portion 2A and the second placement portion 2B in the X direction and the Y direction.

Figure 10:
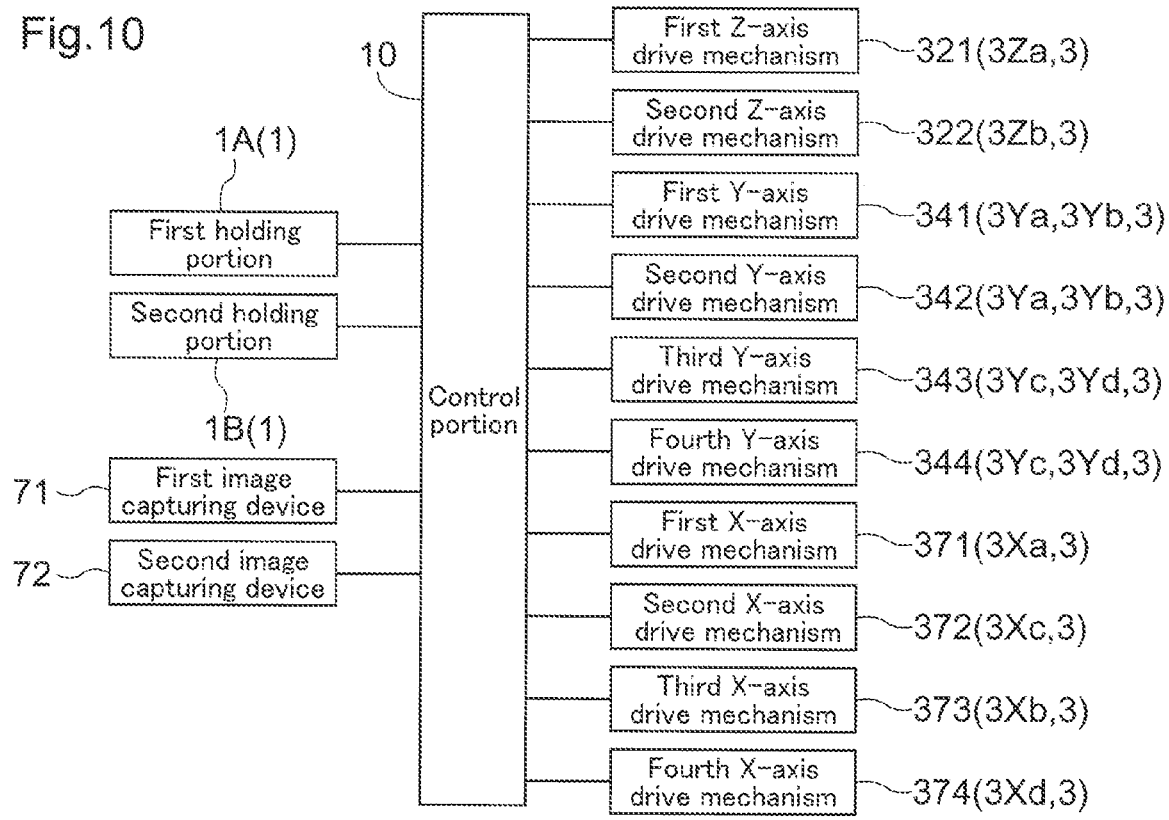
FIG. 10 is a control block diagram of the article transfer facility according to the second embodiment.

As shown in FIGS. 9 and 10, in the present embodiment, the drive portion 3 has a first Z-axis guide body 311 that guides the first holding portion 1A in the Z direction, a second Z-axis guide body 312 that guides the second holding portion 1B in the Z direction, a first Z-axis drive mechanism 321 that moves the first holding portion 1A in the Z direction, and a second Z-axis drive mechanism 322 that moves the second holding portion 1B in the Z direction.

Further, in the present embodiment, the drive portion 3 includes a first X-axis moving body 351 that is coupled to the first Z-axis guide body 311, a second X-axis moving body 352 that is coupled to the second Z-axis guide body 312, a third X-axis moving body 353 that is coupled to the first placement portion 2A, a fourth X-axis moving body 354 that is coupled to the second placement portion 2B, a first X-axis guide body 361 that guides the first X-axis moving body 351 and the second X-axis moving body 352 in the X direction, a second X-axis guide body 362 that guides the third X-axis moving body 353 and the fourth X-axis moving body 354 in the X direction, a first X-axis drive mechanism 371 that moves the first X-axis moving body 351 in the X direction, a second X-axis drive mechanism 372 that moves the second X-axis moving body 352 in the X direction, a third X-axis drive mechanism 373 that moves the third X-axis moving body 353 in the X direction, and a fourth X-axis drive mechanism 374 that moves the fourth X-axis moving body 354 in the X direction.

Further, in the present embodiment, the drive portion 3 includes a first Y-axis guide body 331 and a second Y-axis guide body 332 that guide the first X-axis guide body 361 and the second X-axis guide body 362 in the Y direction, a first Y-axis drive mechanism 341 and a second Y-axis drive mechanism 342 that move the first X-axis guide body 361 in the Y direction, and a third Y-axis drive mechanism 343 and a fourth Y-axis drive mechanism 344 that move the second X-axis guide body 362 in the Y direction.

The first Z-axis guide body 311 is a rail member that extends in the Z direction. A support 12 of the first holding portion 1A is attached to the first Z-axis guide body 311 so as to be movable in the Z direction. In the present embodiment, the first Z-axis drive mechanism 321 has a first Z-axis ball screw that extends in the Z direction and is mated to the support 12 of the first holding portion 1A, and a first Z-axis motor for rotating the first Z-axis ball screw (neither being shown). By rotating the first Z-axis ball screw with use of the first Z-axis motor, the first Z-axis drive mechanism 321 moves the support 12 of the first holding portion 1A, which is supported by the first Z-axis guide body 311, in the Z direction. In this way, in the present embodiment, the first Z-axis guide body 311 and the first Z-axis drive mechanism 321 function as the first Z-axis drive portion 3Za that moves and guides the first holding portion 1A in the Z direction.

The second Z-axis guide body 312 is a rail member that extends in the Z direction. The support 12 of the second holding portion 1B is attached to the second Z-axis guide body 312 so as to be movable in the Z direction. In the present embodiment, the second Z-axis drive mechanism 322 includes a second Z-axis ball screw that extends in the Z direction and is mated to the support 12 of the second holding portion 1B, and a second Z-axis motor for rotating the second Z-axis ball screw (neither being shown). By rotating the second Z-axis ball screw with use of the second Z-axis motor, the second Z-axis drive mechanism 322 moves and guides the support 12 of the second holding portion 1B, which is supported by the second Z-axis guide body 312, in the Z direction. In this way, in the present embodiment, the second Z-axis guide body 312 and the second Z-axis drive mechanism 322 function as the second Z-axis drive portion 3Zb that moves and guides the second holding portion 1B in the Z direction.

The first X-axis moving body 351 is attached to the first X-axis guide body 361, which is a rail member that extends in the X direction, so as to be movable in the X direction. The first X-axis moving body 351 is arranged on the first X-direction side X1 of the second X-axis moving body 352. The first Z-axis guide body 311 is arranged on the second Y-direction side Y2 of the first X-axis moving body 351, and the first Z-axis guide body 311 is supported by the first X-axis moving body 351. In the present embodiment, the first X-axis drive mechanism 371 includes a first X-axis ball screw that extends in the X direction and is mated to the first X-axis moving body 351, and a first X-axis motor for rotating the first X-axis ball screw (neither being shown). By rotating the first X-axis ball screw with use of the first X-axis motor, the first X-axis drive mechanism 371 moves the first X-axis moving body 351, which is supported by the first X-axis guide body 361, in the X direction. In this way, in the present embodiment, the first X-axis moving body 351, the first X-axis guide body 361, and the first X-axis drive mechanism 371 function as the first X-axis drive portion 3Xa that moves and guides the first holding portion 1A in the X direction.

The second X-axis moving body 352 is attached to the first X-axis guide body 361 so as to be movable in the X direction. The second X-axis moving body 352 is arranged on the second X-direction side X2 of the first X-axis moving body 351. The second Z-axis guide body 312 is arranged on the second Y-direction side Y2 of the second X-axis moving body 352, and the second Z-axis guide body 312 is supported by the second X-axis moving body 352. In the present embodiment, the second X-axis drive mechanism 372 includes a second X-axis ball screw that extends in the X direction and is mated to the second X-axis moving body 352, and a second X-axis motor for rotating the second X-axis ball screw (neither being shown). By rotating the second X-axis ball screw with use of the second X-axis motor, the second X-axis drive mechanism 372 moves the second X-axis moving body 352, which is supported by the first X-axis guide body 361, in the X direction. In this way, in the present embodiment, the second X-axis moving body 352, the first X-axis guide body 361, and the second X-axis drive mechanism 372 function as the third X-axis drive portion 3Xc that moves and guides the second holding portion 1B in the X direction.

The third X-axis moving body 353 is attached to the second X-axis guide body 362, which is a rail member that extends in the X direction, so as to be movable in the X direction. The third X-axis moving body 353 is arranged on the first X-direction side X1 of the fourth X-axis moving body 354. The first placement portion 2A is arranged on the first Y-direction side Y1 of the third X-axis moving body 353, and the first placement portion 2A is supported by the third X-axis moving body 353. In the present embodiment, the third X-axis drive mechanism 373 includes a third X-axis ball screw that extends in the X direction and is mated to the third X-axis moving body 353, and a third X-axis motor for rotating the third X-axis ball screw (neither being shown). By rotating the third X-axis ball screw with use of the third X-axis motor, the third X-axis drive mechanism 373 moves the third X-axis moving body 353, which is supported by the second X-axis guide body 362, in the X direction. In this way, in the present embodiment, the third X-axis moving body 353, the second X-axis guide body 362, and the third X-axis drive mechanism 373 function as the second X-axis drive portion 3Xb that moves and guides the first placement portion 2A in the X direction.

The fourth X-axis moving body 354 is attached to the second X-axis guide body 362 so as to be movable in the X direction. The fourth X-axis moving body 354 is arranged on the second X-direction side X2 of the third X-axis moving body 353. The second placement portion 2B is arranged on the first Y-direction side Y1 of the fourth X-axis moving body 354, and the second placement portion 2B is supported by the fourth X-axis moving body 354. In the present embodiment, the fourth X-axis drive mechanism 374 includes a fourth X-axis ball screw that extends in the X direction and is mated to the fourth X-axis moving body 354, and a fourth X-axis motor for rotating the fourth X-axis ball screw (neither being shown). By rotating the fourth X-axis ball screw with use of the fourth X-axis motor, the fourth X-axis drive mechanism 374 moves the fourth X-axis moving body 354, which is supported by the second X-axis guide body 362, in the X direction. In this way, in the present embodiment, the fourth X-axis moving body 354, the second X-axis guide body 362, and the fourth X-axis drive mechanism 374 function as the fourth X-axis drive portion 3Xd that moves and guides the second placement portion 2B in the X direction.

The first Y-axis guide body 331 is a rail member that extends in the Y direction. The first Y-axis guide body 331 supports the first X-axis guide body 361 and the second X-axis guide body 362 from the lower side Z2 such that end portions thereof on the first X-direction side X1 can move in the Y direction. The second Y-axis guide body 332 is a rail member that extends in the Y direction. The second Y-axis guide body 332 supports the first X-axis guide body 361 and the second X-axis guide body 362 from the lower side Z2 such that end portions thereof on the second X-direction side X2 can move in the Y direction.

In the present embodiment, the first Y-axis drive mechanism 341 has a first Y-axis ball screw that extends in the Y direction and is mated to the end portion of the first X-axis guide body 361 on the first X-direction side X1, and a first Y-axis motor that rotates the first Y-axis ball screw (neither being shown). Further, in the present embodiment, the second Y-axis drive mechanism 342 includes a second Y-axis ball screw that extends in the Y direction and is mated to the end portion of the first X-axis guide body 361 on the second X-direction side X2, and a second Y-axis motor that rotates the second Y-axis ball screw (neither being shown). The first Y-axis drive mechanism 341 rotates the first Y-axis ball screw with use of the first Y-axis motor, and the second Y-axis drive mechanism 342 rotates the second Y-axis ball screw with use of the second Y-axis motor, and thus the first X-axis guide body 361, which is supported by the first Y-axis guide body 331 and the second Y-axis guide body 332, is moved in the Y direction. In this way, in the present embodiment, the first Y-axis guide body 331 and the second Y-axis guide body 332, as well as the first Y-axis drive mechanism 341 and the second Y-axis drive mechanism 342 function as the first Y-axis drive portion 3Ya that moves and guides the first holding portion 1A in the Y direction, and the second Y-axis drive portion 3Yb that moves and guides the second holding portion 1B in the Y direction.

Also, in the present embodiment, the third Y-axis drive mechanism 343 includes a third Y-axis ball screw that extends in the Y direction and is mated to the end portion of the second X-axis guide body 362 on the first X-direction side X1, and a third Y-axis motor that rotates the third Y-axis ball screw (neither being shown). Further, in the present embodiment, the fourth Y-axis drive mechanism 344 has a fourth Y-axis ball screw that extends in the Y direction and is mated to the end portion of the second X-axis guide body 362 on the second X-direction side X2, and a fourth Y-axis motor that rotates the fourth Y-axis ball screw (neither being shown). The third Y-axis drive mechanism 343 rotates the third Y-axis ball screw with use of the third Y-axis motor, and the fourth Y-axis drive mechanism 344 rotates the fourth Y-axis ball screw with use of the fourth Y-axis motor, and thus the second X-axis guide body 362, which is supported by the first Y-axis guide body 331 and the second Y-axis guide body 332, is moved in the Y direction. In this way, in the present embodiment, the first Y-axis guide body 331 and the second Y-axis guide body 332, as well as the third Y-axis drive mechanism 343 and the fourth Y-axis drive mechanism 344 function as the third Y-axis drive portion 3Yc that moves and guides the first placement portion 2A in the Y direction, and the fourth Y-axis drive portion 3Yd that moves and guides the second placement portion 2B in the Y direction.

As shown in FIG. 10, in the present embodiment, the control portion 10 controls the first Z-axis drive mechanism 321 and the second Z-axis drive mechanism 322, the first to fourth Y-axis drive mechanisms 341 to 344, and the first to fourth X-axis drive mechanisms 371 to 374. Specifically, the control portion 10 controls the first Z-axis motor and the second Z-axis motor of the first Z-axis drive mechanism 321 and the second Z-axis drive mechanism 322, the first to fourth Y-axis motors of the first to fourth Y-axis drive mechanisms 341 to 344, and the first to fourth X-axis motors of the first to fourth X-axis drive mechanisms 371 to 374.

Also, in the present embodiment, the control portion 10 controls constituent elements as follows.

Specifically, the control portion 10 controls the suction pads 11 of the first holding portion 1A and the second holding portion 1B so as to switch between the suction state of suctioning an article W and the non-suction state of not suctioning an article W. The control portion 10 controls the first image capturing device 71 and the second image capturing device 72. Based on captured image information transmitted by the first image capturing device 71, the control portion 10 recognizes the position and orientation of the first container C1 at the first position P1, as well as the state of the inside of the first container C1 (e.g., the presence/absence of an article W, and the position and orientation of an article W). Further, based on captured image information transmitted by the second image capturing device 72, the control portion 10 recognizes the position and orientation of the second container C2 at the second position P2, as well as the state of the inside of the second container C2 (e.g., the presence/absence of an article W, and the position and orientation of an article W).

Hereinafter, the first control and the second control by the control portion 10 of the present embodiment will be described with reference to FIGS. 9 and 11 to 16.

FIG. 9 shows an example of the initial state of the article transfer facility 100 before the start of the first control according to the present embodiment. In this state, the first container C1 contains articles W, and the second container C2 does not contain articles W. In the illustrated example, a total of eight articles W are housed in the first container C1 such that two articles W are arranged side-by-side in the X direction in each row and four articles W are arranged side-by-side in the Y direction in each column. Also, the first X-axis moving body 351 and the second X-axis moving body 352 are located farthest on the first X-direction side X1 of the movement range on the first X-axis guide body 361, and the third X-axis moving body 353 and the fourth X-axis moving body 354 are located farthest on the first X-direction side X1 of the movement range on the second X-axis guide body 362. Further, the first X-axis guide body 361 is located farthest on the first Y-direction side Y1 of the movement range on the first Y-axis guide body 331 and the second Y-axis guide body 332, and the second X-axis guide body 362 are located farthest on the second Y-direction side Y2 of the movement range on the first Y-direction guide body 331 and the second Y-axis guide body 332.

Figure 11:
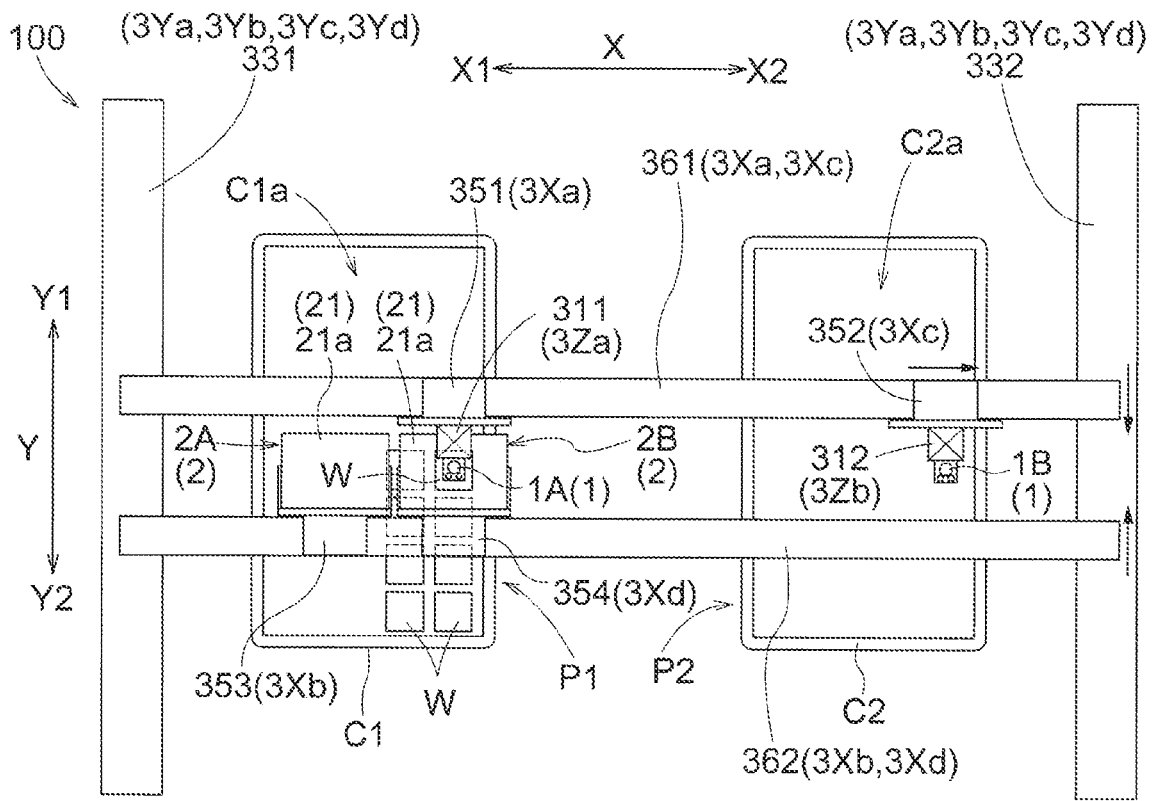
FIG. 11 is a plan view showing first control performed by a control portion according to the second embodiment.

As shown in FIG. 11, in the first control, first, the second X-axis moving body 352 moves toward the second X-direction side X2 such that the X-direction position of the suction pad 11 of the second holding portion 1B matches the X-direction position where the articles W are to be released and unloaded into the second container C2.

Next, the first holding portion 1A picks up one article W stored in the first container C1. Note that in the illustrated example, the first holding portion 1A picks up the article W that is farthest on the first Y-direction side Y1 and the second X-direction side X2.

Specifically, the first X-axis guide body 361 moves toward the second Y-direction side Y2 and the first X-axis moving body 351 moves toward the second X-direction side X2 such that the suction pad 11 of the first holding portion 1A is overlapped with an article W stored in the first container C1 in a view along the Z direction. Then, in order for the first holding portion 1A to pick up the article W, the support 12 of the first holding portion 1A moves toward the lower side Z2 of the first Z-axis guide body 311. After the article W is picked up by the first holding portion 1A, the support 12 of the first holding portion 1A moves toward the upper side Z1 of the first Z-axis guide body 311 until the article W is located on the upper side Z1 of the placement surface 21a of the second placement portion 2B. Thereafter, the fourth X-axis moving body 354 moves toward the second X-direction side X2 and the second X-axis guide body 362 moves toward the first Y-direction side Y1 such that the article W held by the first holding portion 1A is overlapped with the placement surface 21a of the second placement portion 2B in a view along the Z direction. Then, the suction pad 11 of the first holding portion 1A enters the non-suction state, and the article W is released from the first holding portion 1A and placed on the placement surface 21a of the second placement portion 2B.

Figure 12:
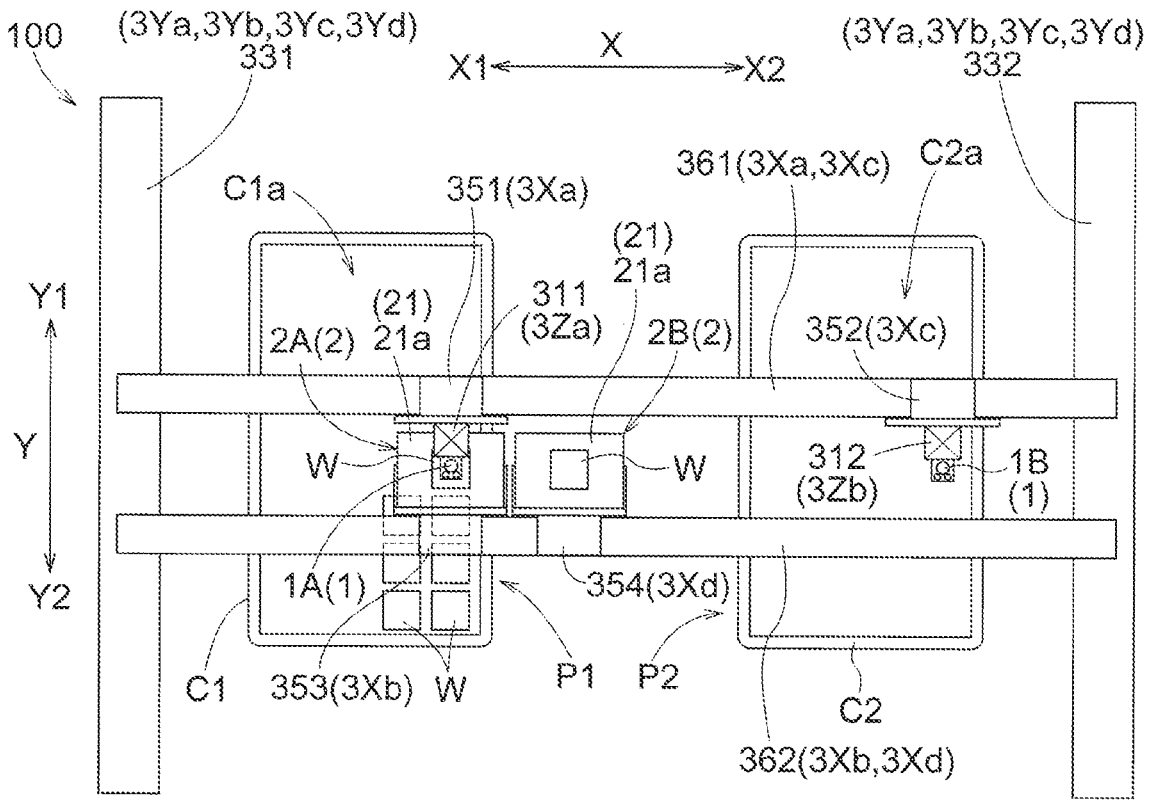
FIG. 12 is a plan view showing the first control performed by the control portion according to the second embodiment.

Thereafter, as shown in FIG. 12, similarly to the description given above, the first holding portion 1A picks up another article W stored in the first container C1 and places the article W on the placement surface 21a of the first placement portion 2A. Note that in the illustrated example, the first holding portion 1A picks up the article W that is farthest on the first Y-direction side Y1 and the first X-direction side X1.

Figure 13:
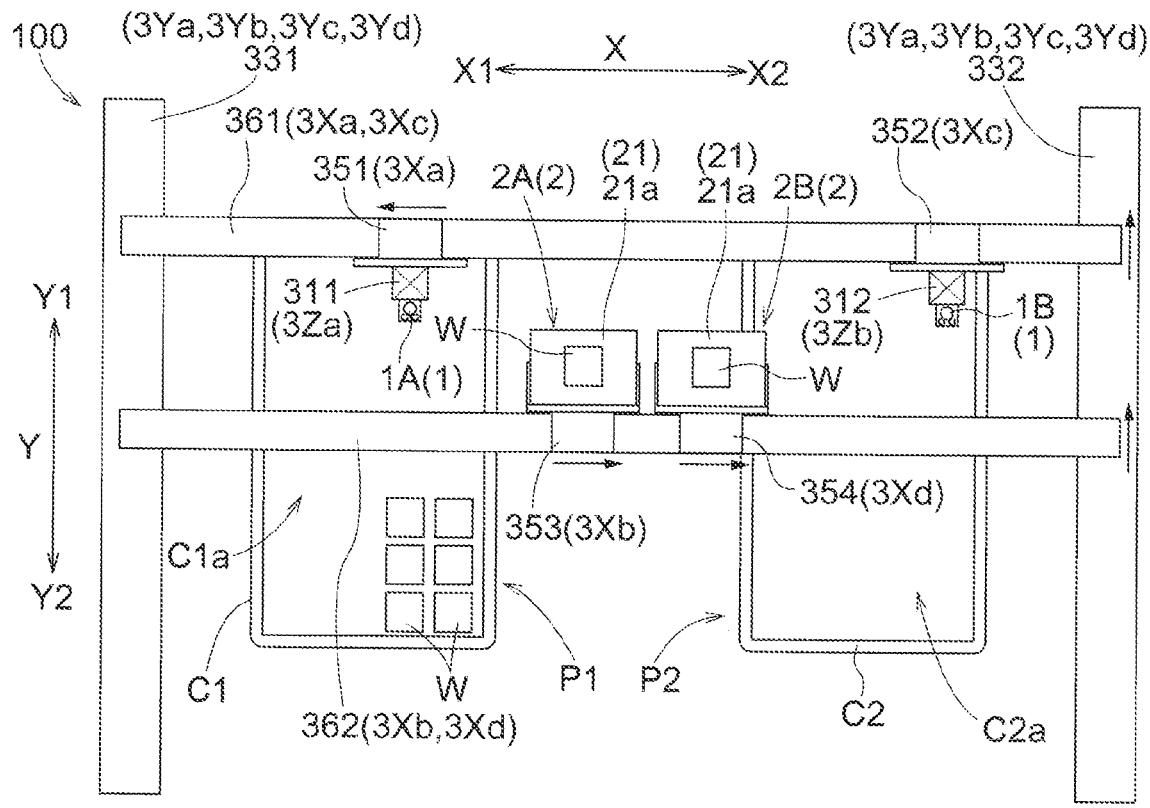
FIG. 13 is a plan view showing second control performed by the control portion according to the second embodiment.
Figure 14:
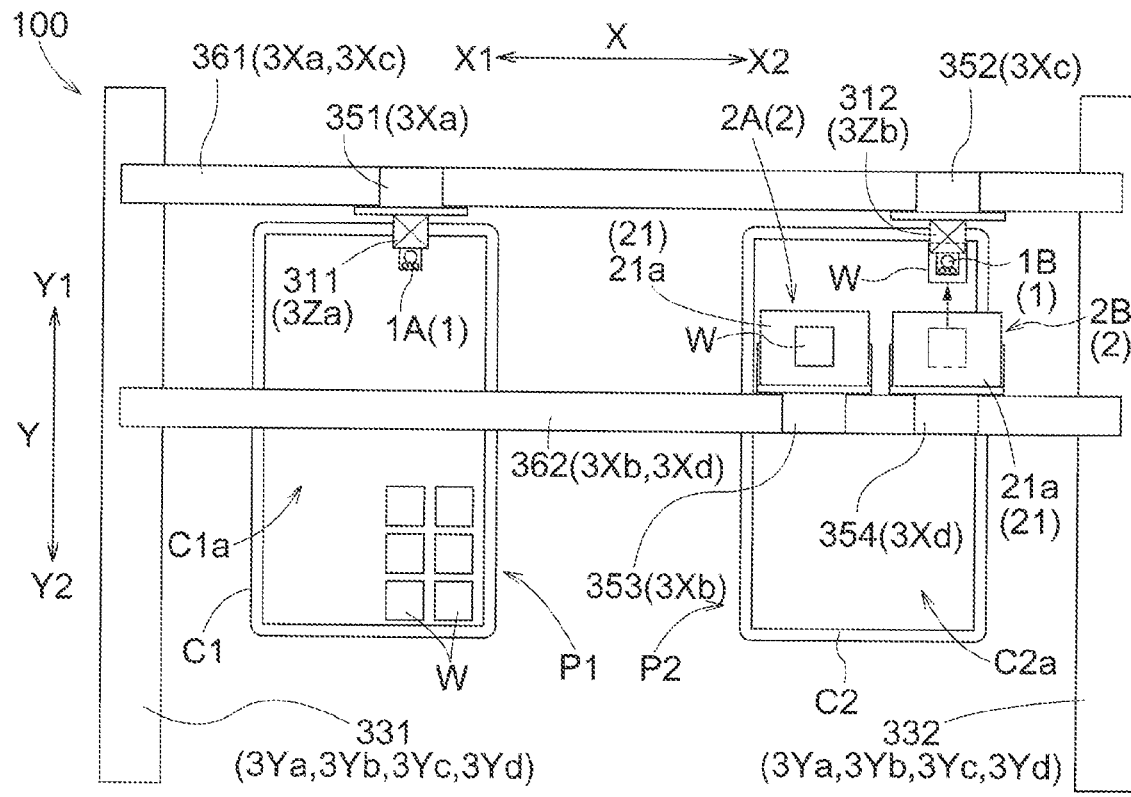
FIG. 14 is a plan view showing the second control performed by the control portion according to the second embodiment.

Subsequently, the control portion 10 starts the second control for moving the article W from the placement portion 2 to the second position. As shown in FIGS. 13 and 14, in the second control, the first X-axis guide body 361 and the second X-axis guide body 362 move toward the first Y-direction side Y1, and the third X-axis moving body 353 and the fourth X-axis moving body 354, which support the placement portion 2A and the second placement portion 2B on which articles W are placed, move toward the second X-direction side X2 so as to become overlapped with the second container C2 in a view along the Z direction.

Then, as shown in FIG. 14, the second holding portion 1B picks up the article W placed on the second placement portion 2B. Specifically, the support 12 of the second holding portion 1B moves toward the upper side Z1 of the second Z-axis guide body 312 such that the suction pad 11 of the second holding portion 1B is located on the upper side Z1 of the article W placed on the second placement portion 2B. Then, the fourth X-axis moving body 354 and the second X-axis guide body 362 move such that the suction pad 11 of the second holding portion 1B is overlapped with the article W placed on the second placement portion 2B in a view along the Z direction. Thereafter, in order for the second holding portion 1B to pick up the article W placed on the second placement portion 2B, the support 12 of the second holding portion 1B moves toward the lower side Z2 of the second Z-axis guide body 312. After the second holding portion 1B picks up the article W placed on the second placement portion 2B, the support 12 of the second holding portion 1B moves toward the upper side Z1 of the second Z-axis guide body 312 such that the article W is located on the upper side Z1 of the placement surface 21a of the second placement portion 2B. Then, the second X-axis guide body 362 moves toward the second Y-direction side Y2 such that the article W held by the second holding portion 1B is not overlapped with the placement surface 21a of the second placement portion 2B in a view along the Z direction.

Figure 16:
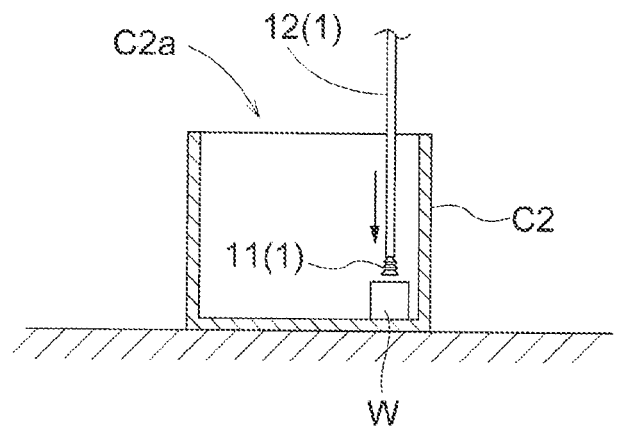
FIG. 16 is a front view showing the second control performed by the control portion according to the second embodiment.

Thereafter, as shown in FIG. 16, the support 12 of the holding portion 1B moves toward the lower side Z2 of the second Z-axis guide body 312 until the article W held by the second holding portion 1B enters the second container C2 through the second opening C2a and approaches the bottom surface of the second container C2. Then, the suction pad 11 of the second holding portion 1B enters the non-suction state, and the article W is released from the second holding portion 1B and placed on the bottom surface of the second container C2.

Figure 15:
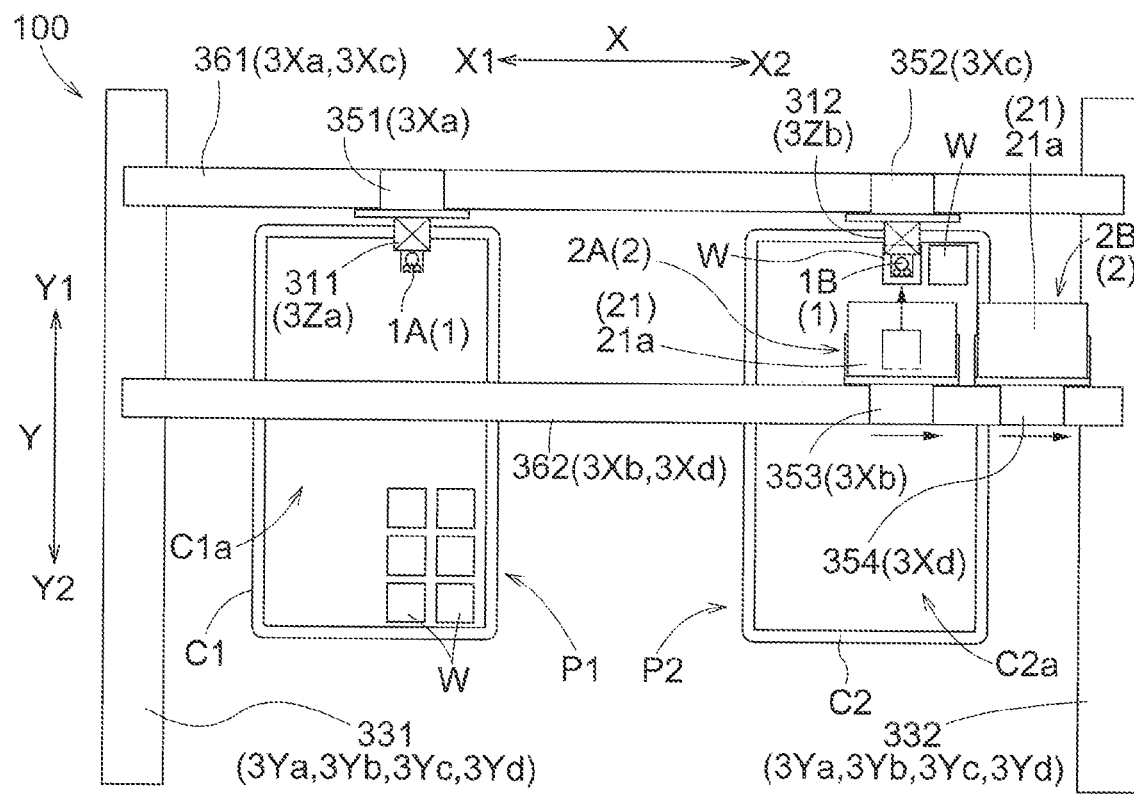
FIG. 15 is a plan view showing the second control performed by the control portion according to the second embodiment.

Thereafter, as shown in FIG. 15, similarly to the description given above, the second holding portion 1B picks up the article W placed on the first placement portion 2A and places the article W on the bottom surface of the second container C2. Note that in the illustrated example, the articles W are arranged side-by-side in the X direction on the bottom surface of the second container C2. The control portion 10 repeatedly performs the control described above.

Figure 17:
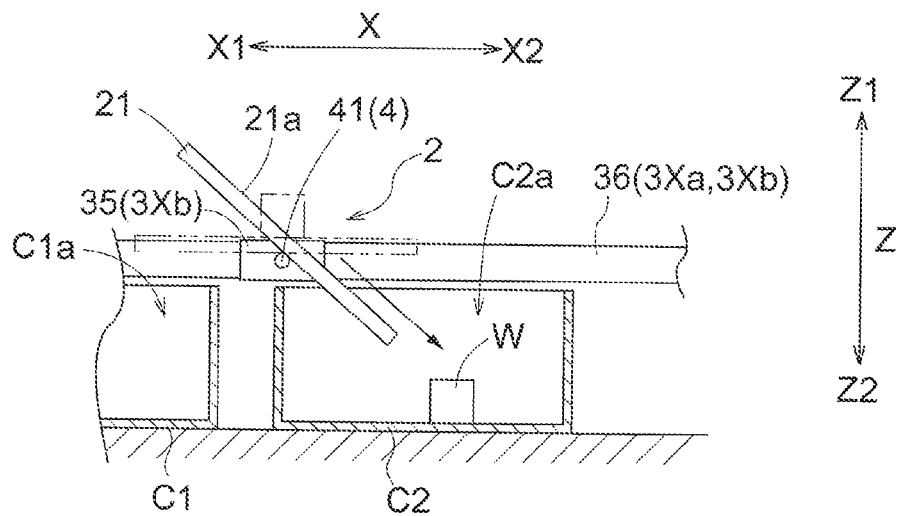
FIG. 17 is a front view showing a placement portion according to another embodiment.
Figure 18:
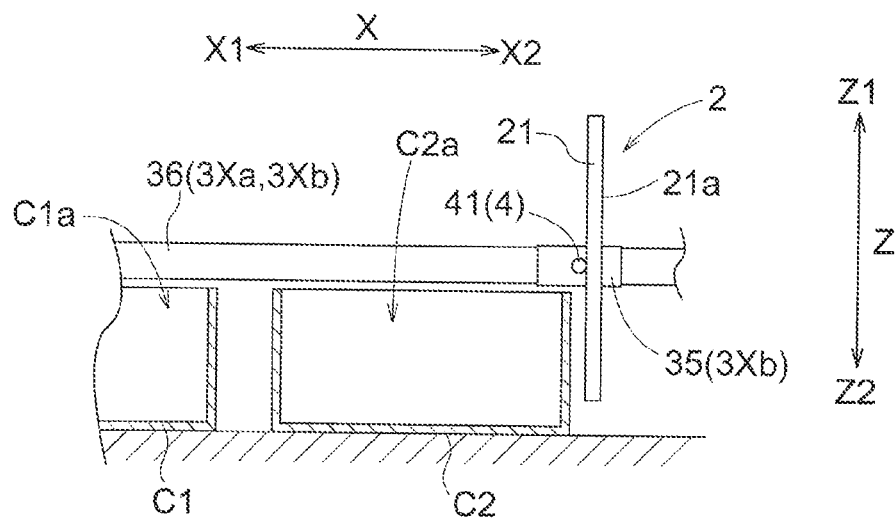
FIG. 18 is a front view showing the placement portion according to the other embodiment.

3. Other Embodiments (1) In the first embodiment, an example is described in which the placement portion 2 has the main body portion 21, on which the placement surface 21a is formed and the pair of coupling portions 22, and rotates around the rotation shaft 41 that is coupled to the pair of coupling portions 22, but the present invention is not limited to such a configuration. For example, as shown in FIGS. 17 and 18, a configuration is possible in which the placement portion 2 has the plate-shaped main body portion 21 on which the placement surface 21a is formed, and the rotation shaft 41 is coupled to the main body portion 21. With such a configuration, as shown in FIG. 17, the main body portion 21 rotates around the rotation shaft 41 such that the placement surface 21a is tilted from the horizontal plane and the article W placed on the placement surface 21a slides along the inclined placement surface 21a and is unloaded from the placement portion 2. Further, in order to shorten the time required for the second control, the placement portion 2 may rotate around the rotation shaft 41 while moving in the X direction so as to simultaneously move the article W in the X direction and tilt the placement surface 21a such that the article W slides and is unloaded. Further, as shown in FIG. 18, if the main body portion 21 is elongated in the Z direction and is arranged adjacent to the second container C2 on the second X-direction side X2, in the case where multiple placement portions 2 are provided for example, it is possible to move one placement portion 2 out of the way so as to not hinder the movement of another placement portion 2.

Figure 19:
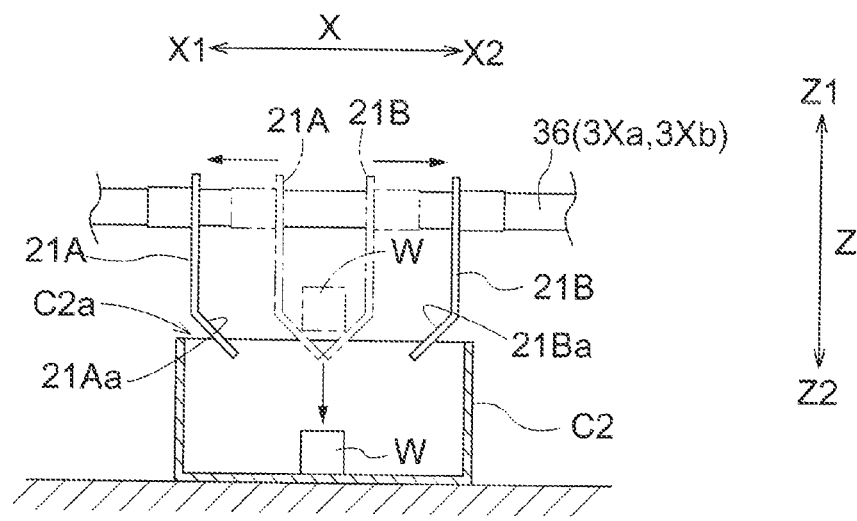
FIG. 19 is a front view showing the placement portion according to yet another embodiment.

(2) In the first embodiment, an example is described in which the placement portion 2 has the main body portion 21 on which the placement surface 21a is formed and the pair of coupling portions 22, and the unloading portion 4 has the rotation shaft 41, which is coupled to the placement portion 2, and the rotational driving force source 42 for rotating the rotation shaft 41 around the axis thereof, but the present invention is not limited to such a configuration. For example, as shown in FIG. 19, a configuration is possible in which the placement portion 2 has a first main body portion 21A and a second main body portion 21B that are guided by the X-axis guide body 36 in the X direction, and the unloading portion 4 has an X-axis driving force source (not shown) that moves the first main body portion 21A and the second main body portion 21B closer to each other and farther from each other in the X direction. The first main body portion 21A is arranged on the first X-direction side X1 of the second main body portion 21B. The first main body portion 21A extends from the portion supported by the X-axis guide body 36 toward the lower side Z2 along the Z direction, and is then inclined from the Z direction so as to approach the second X-direction side X2 while extending toward the lower side Z2. A first placement surface 21Aa is formed on the surface of the second X-direction side X2 of the inclined portion. The second main body portion 21B extends from the portion supported by the X-axis guide body 36 toward the lower side Z2 along the Z direction, and is then inclined from the Z direction so as to approach the first X-direction side X1 while extending toward the lower side Z2. A second placement surface 21Ba is formed on the surface of the first X-direction side X1 of this inclined portion. An article W is placed on the first placement surface 21Aa and the second placement surface 21Ba in a state where the end portion of the first main body portion 21A on the lower side Z2 and the end portion of the second main body portion 21B on the lower side Z2 are in contact or close to each other. Then, by moving the first main body portion 21A and the second main body portion 21B in the X direction so as to separate from each other, the article W placed on the first placement surface 21Aa and the second placement surface 21Ba is caused to slide along the inclined first placement surface 21Aa and second placement surface 21Ba and be unloaded from the placement portion 2.

(3) In the above embodiment, an example is described in which the first position P1 is set as a transfer target location along the transport path of the first transport device 61, the second position P2 is set as a transfer target location along the transport path of the second transport device 62, and the drive portion 3 is disposed so as to straddle these transfer target locations. However, the transfer target locations, the arrangement position of the drive portion 3 relative to the first transport device 61 and the second transport device 62, and the like may be changed as appropriate. For example, a configuration is possible in which the first position P1 is set at the downstream end of the transport path of the first transport device 61, the second position P2 is set at the downstream end of the transport path of the second transport device 62, and the drive portion 3 is disposed so as to straddle such positions. Alternatively, a configuration is possible in which the transport path of the article W is bent or curved, transfer target locations are set along the bent portion or the curve, and the drive portion 3 is disposed at a position where it can transfer articles to such transfer target locations.

(4) In the above embodiment, an example is described in which both the first transport device 61 (conveyor) for transporting the first container C1 (container) and the second transport device 62 (conveyor) for transporting the second container C2 (container) are configured as roller conveyors. However, the configuration of the transport devices for transporting containers is not limited to this, and various known transport devices can be used, such as a transport carriage or a carousel-type transport mechanism. Also, the transfer target location for an article W is not limited to being a container transported by such a transport device, and the transfer target location can be various locations where the article W is to be placed. For example, a container transported by an operator may be the transfer target location, or the transport surface of a transport device not having a container may be the transfer target location.

Figure 20:
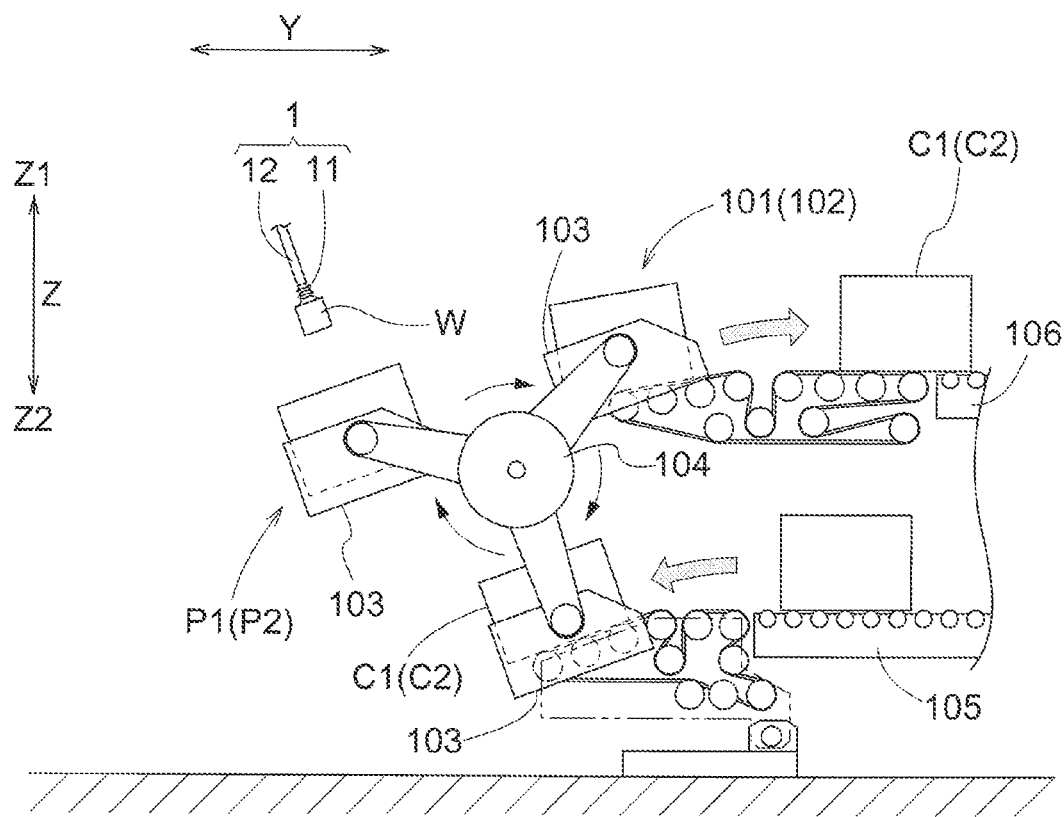
FIG. 20 is a side view of the article transfer facility according to another embodiment.

For example, as shown in FIG. 20, a picking station provided with a carousel-type transport mechanism is also suitable as a transfer target location. In the example shown in this figure, the article transfer facility 100 includes a first picking device 101 that transports the first container C1 so as to revolve around an axis extending in the X direction, and a second picking device 102 that transports the second container C2 so as to revolve around an axis extending in the X direction. The containers (the first container C1 and the second container C2) that are transported by these picking devices (the first picking device 101 and the second picking device 102) are the transfer target locations. For this reason, the drive portion 3 is disposed on the upper side Z1 of the first picking device 101 and the second picking device 102, which are arranged side-by-side in the X direction. The first picking device 101 includes a plurality of supports 103 that support the first container C1, a support rotating body 104 that moves the supports 103 around an axis along the X direction, a first conveyor 105, and a second conveyor 106. The first picking device 101 passes the first container C1 from the first conveyor 105 to the support 103, transports the first container C1 so as to revolve around the axis along the X direction, and then transports the first container C1 so as to pass from the support 103 to the second conveyor 106. The first position P1 is set along the revolving transport path of the first picking device 101. The second picking device 102 is configured similarly to the first picking device 101, and the support 103 supports and conveys the second container C2. Also, the second position P2 is set along the revolving transport path of the second picking device 102. The drive portion 3 is driven such that an article W is transferred from the first container C1 supported by the support 103 at the first position P1 of the first picking device 101 to the second container C2 supported by the support 103 at the second position P2 of the second picking device 102.

(5) In the first embodiment, an example is described in which, in the first control, the control portion 10 controls the drive portion 3 such that the holding portion 1 picks up the article W at the first position P1 and moves to a position on the upper side Z1 of the placement portion 2, and then releases the article W and places the article W on the placement portion 2, and in the second control, the control portion 10 controls the drive portion 3 such that the placement portion 2 moves to a position on the upper side Z1 of the second position P2, and thereafter controls the unloading portion 4 such that the article W placed on the placement portion 2 is unloaded from the placement portion 2 to the second position P2. However, the present invention is not limited to such a configuration, and the control portion 10 may be able to select between executing the first control and the second control and executing third control different therefrom. In the third control, the control portion 10 controls the drive portion 3 such that the holding portion 1 picks up the article W at the first position P1 and moves to a position on the upper side Z1 of the second position P2, and then releases the article W and arranges the article W at the second position P2. Further, in the third control, it is preferable that the control portion 10 controls the drive portion 3 such that, in at least a portion of the transfer path of the holding portion 1 when transferring an article W from the first position P1 to the second position P2, the placement portion 2 moves in synchronization with the holding portion 1 at a position on the lower side Z2 of the article W being held by the holding portion 1. By moving the placement portion 2 in this way, even if the article W being held by the holding portion 1 is unintentionally released, the article W can be caught by the placement portion 2, and the possibility of damage to the article W can be reduced.

(6) In the first embodiment, an example is described in which the first transport device 61 transports the first container C1 toward the first Y-direction side Y1, and the second transport device 62 transports the second container C2 toward the second Y-direction side Y2. However, the directions in which the first transport device 61 and the second transport device 62 transport the containers may be changed as appropriate. For example, both the first transport device 61 and the second transport device 62 may transport the containers to the same Y-direction side. Alternatively, the transport direction of the first transport device 61 and the transport direction of the second transport device 62 may intersect each other. In this case, the installation heights of the first transport device 61 and the second transport device 62 may be different.

(7) In the above embodiment, an example is described in which the first container C1 and the second container C2 that store articles W are respectively arranged at the first position P1 and the second position P2. However, the present invention is not limited to such a configuration, and a configuration is possible in which, for example, the first container C1 and the second container C2 are not respectively arranged at the first position P1 and the second position P2, and an article W arranged at the first position P1 is transferred to the second position P2. Further, either the first container C1 or the second container C2 may be arranged at either the first position P1 or the second position P2.

(8) In the above embodiment, an example is described in which the Z direction matches the vertical direction. However, the present invention is not limited to such a configuration, and the Z direction may be inclined from the vertical direction.

(9) In the above embodiment, a configuration is described in which one holding portion 1 and one placement portion 2 are provided (first embodiment), and a configuration is described in which two holding portions 1 (first holding portion 1A and second holding portion 1B) and two placement portions 2 (first placement portion 2A and second placement portion 2B) are provided (second embodiment). However, there are no limitations on the number of holding portions 1 and placement portions 2, and three or more of each of the holding portion 1 and the placement portion 2 may be provided, or the number of holding portions 1 and the number of placement portions 2 may be different.

(10) The configuration of the drive portion 3 for moving the holding portion 1 (first holding portion 1A and second holding portion 1B) and the placement portion 2 (first placement portion 2A and second placement portion 2B) is not limited to the configurations described in the embodiments. The connection relationships between the X-axis, Y-axis, and Z-axis guide bodies of the drive portion 3 can be switched as appropriate. Further, it is possible to appropriately change whether a guide body for any axis has a dual-use configuration, or whether all the guide bodies are independent guide bodies.

(11) Note that the configurations disclosed in any of the above-described embodiments can be applied in combination with the configurations disclosed in another embodiment as long as no contradiction arises. Regarding other configurations as well, the embodiments disclosed in the present specification are merely illustrative in all respects. Accordingly, various improvements can be made as appropriate without departing from the gist of the present disclosure.

4. Summary of Above Embodiments

The following describes a summary of the article transfer facility described above.

An article transfer facility according to one aspect is an article transfer facility for transferring an article from a first position to a second position, the article transfer facility including:
a holding portion configured to hold the article;
a placement portion on which the article is to be placed;
a drive portion configured to move the holding portion and the placement portion; and
a control portion configured to control the drive portion,
wherein letting a predetermined reference direction be a Z direction, one of two directions that are orthogonal to each other in a view along the Z direction be an X direction, and another one of the two directions be a Y direction,
the drive portion includes
a first Z-axis drive portion configured to move and guide the holding portion in the Z direction,
a first X-axis drive portion configured to move and guide the holding portion in the X direction,
a first Y-axis drive portion configured to move and guide the holding portion in the Y direction, and
a second X-axis drive portion configured to move and guide the placement portion in the X direction,
the control portion executes first control in which the article at the first position is placed on the placement portion, and second control in which the article placed on the placement portion is arranged at the second position, and
in the first control, the drive portion is controlled such that the holding portion picks up the article at the first position and moves to a position above the placement portion, and thereafter releases the article to place the article on the placement portion.

According to this configuration, in the first control, the holding portion picks up the article at the first position and places the article on the placement portion. For this reason, after placing the article on the placement portion, the holding portion can immediately start moving toward the first position in order to pick up the next article. Accordingly, the time required for article transfer can be reduced compared with a configuration in which the holding portion transfers an article from the first position to the second position on its own.

Also, according to this configuration, the drive portion includes the first Z-axis drive portion, the first X-axis drive portion, the first Y-axis drive portion, and the second X-axis drive portion. In other words, the drive portion is configured as a so-called Cartesian coordinate robot in which the drive portion moves and guides the holding portion in the mutually orthogonal X, Y, and Z directions, and also moves and guides the placement portion in the X direction. Accordingly, the drive portion can have a simpler configuration than a robot arm that has a plurality of joints, for example. Therefore, the manufacturing cost of the article transfer facility can be kept low.

Here, it is preferable that the article transfer facility further includes: an unloading portion configured to operate the placement portion such that the article placed on the placement portion is unloaded directly from the placement portion,
wherein in the second control, the control portion controls the drive portion such that the placement portion moves to a position above the second position, and thereafter controls the unloading portion such that the article placed on the placement portion is unloaded from the placement portion to the second position.

According to this configuration, in the second control, the placement portion operates so as to unload the article directly from the placement portion to the second position. For this reason, the article placed on the placement portion can be arranged at the second position without using another device or the like. As a result, the second control can be executed with a simple configuration.

It is preferable that in the configuration including the unloading portion,
the unloading portion unloads the article placed on the placement portion by rotating the placement portion about an axis extending along a virtual plane orthogonal to the Z direction so as to tilt a placement surface on which the article is placed.

According to this configuration, the article placed on the placement portion can be unloaded from the placement portion by merely rotating the placement portion so as to tilt the placement surface on which the article is placed. Accordingly, the placement portion can have a simple configuration. Also, according to this configuration, the article can slide along the tilted placement surface while being unloaded to the second position. Accordingly, it is possible to minimize the impact acting on the article when the article is unloaded to the second position.

Also, it is preferable that letting the holding portion be a first holding portion, the article transfer facility further comprises a second holding portion that is different from the first holding portion,
the drive portion further includes
a second Z-axis drive portion configured to move and guide the second holding portion in the Z direction,
a third X-axis drive portion configured to move and guide the second holding portion in the X direction, and
a second Y-axis drive portion configured to move and guide the second holding portion in the Y direction, and
in the second control, the control portion controls the drive portion such that the second holding portion picks up the article placed on the placement portion and moves to a position above the second position, and thereafter releases the article to arrange the article at the second position.

According to this configuration, the article placed on the placement portion is arranged at the second position by the second holding portion that can move in the X direction, the Y direction, and the Z direction. For this reason, in the second control, the article held by the second holding portion can be brought close to the placement surface at the second position before the article is released. Accordingly, it is possible to minimize the impact acting on the article when the article is unloaded to the second position. This configuration is suited to the transfer of articles that are vulnerable to impact or the like.

Also, it is preferable that the article transfer facility further includes: a transport device configured to transport a container storing the article toward a first transport-direction side along a transport path that passes through the first position, the first transport-direction side being one side in a transport direction that intersects the Z direction, wherein the container has an opening formed on a first Z-direction side that is one side in the Z direction, and in the first control, after the article stored in the container at the first position is picked up by the holding portion, the control portion controls the transport device to transport the container toward the first transport-direction side, and also controls the drive portion such that the holding portion moves toward the first transport-direction side while also moving toward the first Z-direction side when retrieving the article from the container.

According to this configuration, the container storing the article can be automatically supplied to the first position, and the container can be automatically carried away after the article is taken out. Accordingly, the article transfer operation can be performed efficiently.

Also, according to this configuration, in the first control, after the article stored in the container at the first position is picked up by the holding portion, the container is transported toward the first transport-direction side, and the holding portion moves toward the first transport-direction side while also moving toward the first Z-direction side when retrieving the article from the container. As a result, even if the container is transported toward the first transport-direction side after the article stored in the container at the first position is picked up by the holding portion, it is possible to reduce the possibility that the article held by the holding portion comes into contact with a portion of the container. Accordingly, the container transport efficiency can be improved.

Also, it is preferable that in the first control, the control portion controls the drive portion such that the placement portion and the holding portion holding the article move toward the second position in synchronization while the article held by the holding portion is placed on the placement portion.

According to this configuration, it is possible to avoid interference between the holding portion and the placement portion in the first control. Also, according to this configuration, it is possible to carry out the operation of placing an article on the placement portion in the first control while transporting the article toward the second position. Accordingly, the time required for the transfer of an article from the first position to the second position can be shortened.

Also, it is preferable that the control portion is configured to be able to select between executing the first control and the second control and executing third control, and in the third control, the drive portion is controlled such that the holding portion picks up the article at the first position and moves to a position above the second position and thereafter releases the article to arrange the article at the second position, and the drive portion is also controlled such that, in at least a portion of a transfer path of the holding portion when transferring the article from the first position to the second position, the placement portion moves in synchronization with the holding portion at a position below the article being held by the holding portion.

According to this configuration, in the third control, even if the article is unintentionally released by the holding portion, the article is caught by the placement portion located below the article. Accordingly, even if the article is unintentionally released by the holding portion, the possibility of damage or the like to the article can be reduced.

Note that in the third control, the holding portion transfers the article from the first position to the second position on its own. For this reason, if the third control is selected, the time required for the transfer of the article may be longer than when the first control and the second control are selected. However, the third control is desirable if, for example, the article to be transferred is easily damaged or if there is ample time for transferring the article from the first position to the second position. According to this configuration, it is possible to select between executing the first control and the second control and executing the third control, and therefore the article transfer operation can be appropriately performed according to the situation.

INDUSTRIAL APPLICABILITY

The technology of the present disclosure is applicable to an article transfer facility for transferring an article from a first position to a second position.

DESCRIPTION OF REFERENCE SIGNS

100 Article transfer facility
1 Holding portion
2 Placement portion
3 Drive portion
3Za First Z-axis drive portion
3Ya First Y-axis drive portion
3Xa First X-axis drive portion
3Xb Second X-axis drive portion
4 Unloading portion
10 Control portion
W Article
C1 First container
C1a First opening
C2 Second container
C2a Second opening
P1 First position
P2 Second position
X X direction
Y Y direction (transport direction)
Y1 First Y-direction side (first transport-direction side)
Y2 Second Y-direction side
Z Z direction
Z1 Upper side (first Z-direction side)
Z2 Lower side

The invention claimed is:

1. An article transfer facility for transferring an article from a first position to a second position, the article transfer facility comprising:
a holding portion configured to hold the article;
a placement portion on which the article is to be placed;
a drive portion configured to move the holding portion and the placement portion; and
a control portion configured to control the drive portion, wherein letting a predetermined reference direction be a Z direction, one of two directions that are orthogonal to each other in a view along the Z direction be an X direction, and another one of the two directions be a Y direction, and wherein the drive portion comprises:
   a first Z-axis drive portion configured to move and guide the holding portion in the Z direction,
   a first X-axis drive portion configured to move and guide the holding portion in the X direction,
   a first Y-axis drive portion configured to move and guide the holding portion in the Y direction, and
   a second X-axis drive portion configured to move and guide the placement portion in the X direction, wherein the control portion executes first control in which the article at the first position is placed on the placement portion, and second control in which the article placed on the placement portion is arranged at the second position, and wherein in the first control, the drive portion is controlled such that the holding portion picks up the article at the first position and moves to a position above the placement portion, and thereafter releases the article to place the article on the placement portion, the article transport facility further comprising a transport device configured to transport a container storing the article toward a first transport-direction side along a transport path that passes through the first position, the first transport-direction side being one side in a transport direction that intersects the Z direction, wherein the container has an opening formed on a first Z-direction side that is one side in the Z direction, and wherein in the first control, after the article stored in the container at the first position is picked up by the holding portion, the control portion controls the transport device to transport the container toward the first transport-direction side, and also controls the drive portion such that the holding portion moves toward the first transport-direction side while also moving toward the first Z-direction side when retrieving the article from the container.

2. The article transfer facility according to claim 1, further comprising:
   an unloading portion configured to operate the placement portion such that the article placed on the placement portion is unloaded directly from the placement portion,
   wherein in the second control, the control portion controls the drive portion such that the placement portion moves to a position above the second position, and thereafter controls the unloading portion such that the article placed on the placement portion is unloaded from the placement portion to the second position.

3. The article transfer facility according to claim 2, wherein the unloading portion unloads the article placed on the placement portion by rotating the placement portion about an axis extending along a virtual plane orthogonal to the Z direction so as to tilt a placement surface on which the article is placed.

4. The article transfer facility according to claim 1, wherein letting the holding portion be a first holding portion, the article transfer facility further comprises a second holding portion that is different from the first holding portion, and
   wherein the drive portion further comprises:
      a second Z-axis drive portion configured to move and guide the second holding portion in the Z direction,
      a third X-axis drive portion configured to move and guide the second holding portion in the X direction, and
      a second Y-axis drive portion configured to move and guide the second holding portion in the Y direction, and
   wherein in the second control, the control portion controls the drive portion such that the second holding portion picks up the article placed on the placement portion and moves to a position above the second position, and thereafter releases the article to arrange the article at the second position.

5. An article transfer facility for transferring an article from a first position to a second position, the article transfer facility comprising:
   a holding portion configured to hold the article;
   a placement portion on which the article is to be placed;
   a drive portion configured to move the holding portion and the placement portion; and
   a control portion configured to control the drive portion,
   wherein letting a predetermined reference direction be a Z direction, one of two directions that are orthogonal to each other in a view along the Z direction be an X direction, and another one of the two directions be a Y direction, and
   wherein the drive portion comprises:
      a first Z-axis drive portion configured to move and guide the holding portion in the Z direction,
      a first X-axis drive portion configured to move and guide the holding portion in the X direction,
      a first Y-axis drive portion configured to move and guide the holding portion in the Y direction, and
      a second X-axis drive portion configured to move and guide the placement portion in the X direction,
   wherein the control portion executes first control in which the article at the first position is placed on the placement portion, and second control in which the article placed on the placement portion is arranged at the second position,
   wherein in the first control, the drive portion is controlled such that the holding portion picks up the article at the first position and moves to a position above the placement portion, and thereafter releases the article to place the article on the placement portion, and
   wherein in the first control, the control portion controls the drive portion such that the placement portion and the holding portion holding the article move toward the second position in synchronization while the article held by the holding portion is placed on the placement portion.

6. The article transfer facility according to claim 1, wherein the control portion is configured to be able to select between executing the first control and the second control and executing third control, and
   wherein in the third control, the drive portion is controlled such that the holding portion picks up the article at the first position and moves to a position above the second position and thereafter releases the article to arrange the article at the second position, and the drive portion is also controlled such that, in at least a portion of a transfer path of the holding portion when transferring the article from the first position to the second position, the placement portion moves in synchronization with the holding portion at a position below the article being held by the holding portion.

7. The article transfer facility according to claim 2,
wherein the control portion is configured to be able to select between executing the first control and the second control and executing third control, and
wherein in the third control, the drive portion is controlled such that the holding portion picks up the article at the first position and moves to a position above the second position and thereafter releases the article to arrange the article at the second position, and the drive portion is also controlled such that, in at least a portion of a transfer path of the holding portion when transferring the article from the first position to the second position, the placement portion moves in synchronization with the holding portion at a position below the article being held by the holding portion.

8. The article transfer facility according to claim 3,
wherein the control portion is configured to be able to select between executing the first control and the second control and executing third control, and
wherein in the third control, the drive portion is controlled such that the holding portion picks up the article at the first position and moves to a position above the second position and thereafter releases the article to arrange the article at the second position, and the drive portion is also controlled such that, in at least a portion of a transfer path of the holding portion when transferring the article from the first position to the second position, the placement portion moves in synchronization with the holding portion at a position below the article being held by the holding portion.

9. The article transfer facility according to claim 4,
wherein the control portion is configured to be able to select between executing the first control and the second control and executing third control, and
wherein in the third control, the drive portion is controlled such that the holding portion picks up the article at the first position and moves to a position above the second position and thereafter releases the article to arrange the article at the second position, and the drive portion is also controlled such that, in at least a portion of a transfer path of the holding portion when transferring the article from the first position to the second position, the placement portion moves in synchronization with the holding portion at a position below the article being held by the holding portion.

10. The article transfer facility according to claim 5,
wherein the control portion is configured to be able to select between executing the first control and the second control and executing third control, and
wherein in the third control, the drive portion is controlled such that the holding portion picks up the article at the first position and moves to a position above the second position and thereafter releases the article to arrange the article at the second position, and the drive portion is also controlled such that, in at least a portion of a transfer path of the holding portion when transferring the article from the first position to the second position, the placement portion moves in synchronization with the holding portion at a position below the article being held by the holding portion.

* * * * *